United States Patent [19]

Terasaka et al.

[11] Patent Number: 5,385,801
[45] Date of Patent: Jan. 31, 1995

[54] METHOD OF DEVELOPING ELECTROSTATIC LATENT IMAGE

[75] Inventors: Yoshihisa Terasaka, Settsu; Junji Ohtani, Kobe; Junji Machida, Toyonaka; Tamotsu Shimizu, Settsu; Hiroshi Murasaki, Ibaragi; Hiroshi Mizuno, Ikoma, all of Japan

[73] Assignee: Minolta Camera Kabushiki Kaisha, Osaka, Japan

[21] Appl. No.: 109,741

[22] Filed: Aug. 20, 1993

Related U.S. Application Data

[63] Continuation of Ser. No. 727,524, Jul. 9, 1991, abandoned.

[30] Foreign Application Priority Data

| Jul. 12, 1990 | [JP] | Japan | 2-186697 |
| Jul. 12, 1990 | [JP] | Japan | 2-186698 |
| Jul. 12, 1990 | [JP] | Japan | 2-186700 |
| Jul. 12, 1990 | [JP] | Japan | 2-186701 |
| Jul. 12, 1990 | [JP] | Japan | 2-186705 |
| Jul. 12, 1990 | [JP] | Japan | 2-186707 |

[51] Int. Cl.$^6$ .................................. G03G 13/09
[52] U.S. Cl. ......................... 430/122; 430/108; 430/111
[58] Field of Search ................. 430/106.6, 108, 111, 430/122

[56] References Cited

U.S. PATENT DOCUMENTS

| 3,977,361 | 8/1976 | Nagashima et al. | 118/637 |
| 4,030,447 | 6/1977 | Takahashi et al. | 118/658 |
| 4,235,193 | 11/1980 | Groen et al. | 118/658 |
| 4,449,810 | 5/1984 | Ikesue et al. | 355/3 |
| 4,555,466 | 11/1985 | Okada et al. | 430/106.6 |
| 4,564,647 | 1/1986 | Hayashi et al. | 523/211 |
| 4,629,673 | 12/1986 | Osawa et al. | 430/108 |
| 4,672,016 | 6/1987 | Isoda et al. | 430/108 |
| 4,702,987 | 10/1987 | Fukuchi et al. | 430/122 |
| 4,786,936 | 11/1988 | Ikegawa et al. | 355/300 |
| 4,814,820 | 3/1989 | Hirahara et al. | 355/300 |
| 4,822,708 | 4/1989 | Machida et al. | 430/106.6 |
| 4,835,566 | 5/1989 | Oka et al. | 355/219 |
| 4,912,004 | 3/1990 | Nagatsuka et al. | 430/106.6 |
| 5,093,201 | 3/1992 | Ohtani et al. | 428/407 |
| 5,096,797 | 3/1992 | Yoerger | 430/108 |

FOREIGN PATENT DOCUMENTS

| 54-35735 | 8/1977 | Japan . |
| 52-154639 | 12/1977 | Japan . |
| 57-94754 | 6/1982 | Japan | 430/108 |

*Primary Examiner*—Roland Martin
*Attorney, Agent, or Firm*—Burns, Doane, Swecker & Mathis

[57] ABSTRACT

This invention relates to a method of developing electrostatic latent images which comprises the steps of;

mixing a developer including toners having a mean particle size of 3 to 20 $\mu$m and resin-coated carriers with a large number of pores having a pore size distribution of 0.001 to 3 $\mu$m and a mean pore size of 0.1 to 0.5 $\mu$m on a surface thereof;

applying said developer onto a developing sleeve made of nonmagnetic material and arranged oppositely to an electrostatic latent image-retaining member with a minute gap therebetween;

forming a magnetic brush of the developer by the magnetic force of a magnet member having plural poles in the circumferential direction thereof, said magnet member fixedly arranged within the developing sleeve;

conveying the developer by a rotation of the developing sleeve to a developing zone where the electrostatic latent image-retaining member is arranged oppositely to the developing sleeve; and developing electrostatic latent images by the toners which are held on the developing sleeve.

20 Claims, 16 Drawing Sheets

METHOD OF DEVELOPING ELECTROSTATIC LATENT IMAGE

This application is a continuation of application Ser. No. 07/727,524, filed Jul. 9, 1991, now abandoned.

BACKGROUND OF THE INVENTION

The present invention relates to a magnetic brush developing method, in particular, to a magnetic brush developing method in which a developer is transported by a developer-retaining member provided with a magnet member therewithin to develop electrostatic latent images.

A magnetic brush developing method is a basic method for developing an electrostatic latent image and includes various types of methods. In such a general method, a magnet member is fixedly arranged within a developer-retaining member and developer held on the developer-retaining member is conveyed by rotating the developer-retaining member existing on an outer circumference of the magnet member to a developing zone to carry out a developing.

However, in this method, an image quality is liable to be influenced by a mixture ratio of toners. That is to say, as the mixture ratio of toners is increased, a relative contacting probability with carriers is reduced and electrification-build-up properties of toners are lowered and thus electrical charging of toners becomes insufficient. Poorly charged toners bring about problems such as toner scattering. As a quantity of toners is relatively further increased, aggregated toners can not be sufficiently crushed by either the mechanical mixing and stirring or the mixing and stirring on the developer-retaining member. The aggregated toners are developed, resulting in the formation of white spots in copied images. In addition, toner foggs become remarkable due to the above described aggregated toners and poorly charged toners.

In particular, as toners having small particle diameters are used and the mixture ratio of toners is increased, the above described tendency appears more remarkably.

SUMMARY OF THE INVENTION

The present invention relates to a method of developing an electrostatic latent image, in which a developer is held on a surface of a developing sleeve and conveyed to a developing zone by rotating the developing sleeve provided with a magnet member fixedly arranged therewithin and arranged oppositely to an electrostatic latent image-retaining member, and then an electrostatic latent image formed on a surface of the electrostatic latent image-retaining member is developed. In such a method, the present invention is to prevent a scattering of toners, a fogging by toners, a white spot in copied images and the like, even though a toner mixing ratio is varied.

This invention relates to a method of developing electrostatic latent images which comprises the steps of;

mixing a developer including toners having a mean particle size of 3 to 20 μm and resin-coated carriers with a large number of pores having a pore size distribution of 0.001 to 3 μm and a mean pore size of 0.1 to 0.5 μm on a surface thereof;

applying said developer onto a developing sleeve made of nonmagnetic material and arranged oppositely to an electrostatic latent image-retaining member with a minute gap therebetween;

forming a magnetic brush of the developer by the magnetic force of a magnet member having plural poles in the circumferential direction thereof, said magnet member fixedly arranged within the developing sleeve;

conveying the developer by a rotation of the developing sleeve to a developing zone where the electrostatic latent image-retaining member is arranged oppositely to the developing sleeve; and developing electrostatic latent images by the toners which are held on the developing sleeve.

BRIEF DESCRIPTION OF THE DRAWINGS

FIG. 13 shows a schematic view of a guide member.

DETAILED DESCRIPTION OF THE INVENTION

A method of developing an electrostatic latent image according to the present invention belongs to a magnetic brush developing method. In this method, a nonmagnetic developer-retaining member including a magnet member therein is provided oppositely to a surface of a photosensitive member rotatably driven, and a developer supplied to the developer-retaining member is transported with the developer hold on an outer circumferential surface of the developer-retaining member to a developing zone, where the developer-retaining member is close to a photosensitive member and electrostatic latent images on the photosensitive member were developed. There are known many developer-conveying methods, for example, a method, in which the developer-retaining member and the magnet member are rotatably driven in the same direction to convey the developers, a method, in which the developer-retaining member and the magnet member are rotatably driven in opposite directions to convey the developers, a method, in which merely either developer-retaining member or the magnet member is rotated, and the like.

The present invention relates to a method, in which the developer-retaining member is rotatably driven with the magnet fixed inside the developer-retaining member.

Figure 4:
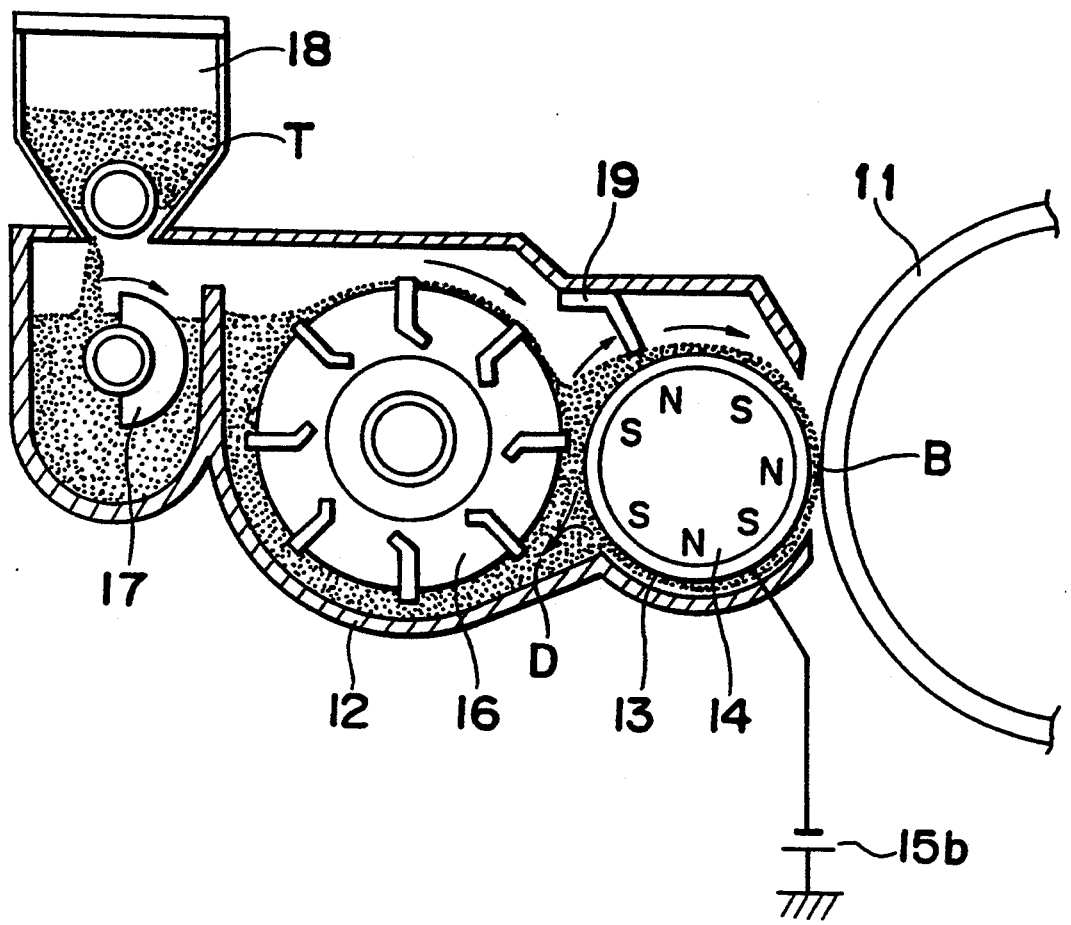
FIG. 4 shows a schematic sectional view of one example of developing apparatus used for working a method of developing an electrostatic latent image.

For easier understanding, FIG. 4 shows one example of a developing apparatus used for a method of developing an electrostatic latent image according to the present invention.

Referring to FIG. 4, reference numeral (12) designates a developing apparatus, reference numeral (11) designating a photosensitive member, reference numeral (13) designating a developer-retaining member (a developing sleeve), reference numeral (14) designating a magnet member, reference numeral (16) designating a bucket roller, reference numeral (17) designating a spiral screw, reference numeral (18) designating a toner hopper, reference numeral (19) designating a layer-thickness-regulating blade, reference mark (D) designating a developer, and reference mark (T) designating a toner.

In the developing apparatus having the above described constitution, a direct current component (15) having the same polarity as an electrostatic latent image is applied to the developer-retaining member (13) as a developing bias.

The developer (D) in the developing apparatus (12) is mixed and stirred by means of the bucket roller (16) rotating in the direction shown by an arrow in FIG. 4 to be frictionally charged. Electrification-build-up properties of toners can be improved and thus toners can be uniformly and sufficiently frictionally charged by using carriers having fine pores on a surface thereof, as mentioned later, as a developer. The frictionally charged developer is supplied onto the developer-retaining member (13) to be conveyed on the developer-retaining member (13) by a rotation of the developer-retaining member (13) in the direction shown by the arrow in FIG. 4. Then, the developer is regulated to an appointed layer-thickness by means of the layer-thickness-regulating blade (19) and arrived at the developing zone (B) to develop an electrostatic latent image on a surface of the photosensitive member (11).

The developer held on the developer-retaining member and conveyed to the developing zone (B) is developed onto an electrostatic latent image by a contact developing method in which a developing is carried out under the condition that an electrostatic latent image is brought into contact with a magnetic brush, a noncontact developing method in which a developing is carried out under the condition that an electrostatic latent image-retaining member is not brought into contact with a magnetic brush and the like.

The mixture ratio of toners is changed by quantity of toners consumed in every development and quantity of toners replenished to the developer and thus the above described problems occur. According to the present invention, a bad influence due to the change in mixture ratio of toners can be prevented by using carriers with fine pores on a surface thereof, as mentioned later.

A developer of the present invention comprises at least a resin-coated carrier and a toner.

First, the resin-coated carrier is explained hereinafter.

Figure 1:
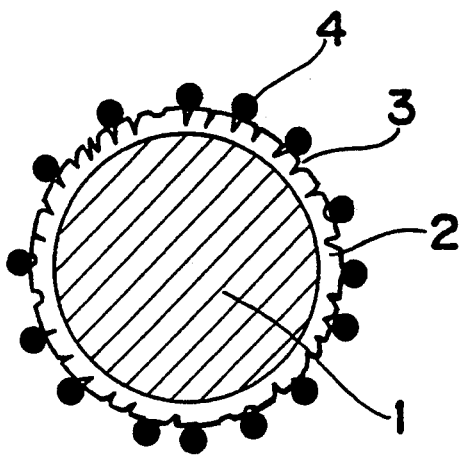
FIG. 1 shows a schematic sectional view of a resin-coated carrier having pores.
Figure 3:
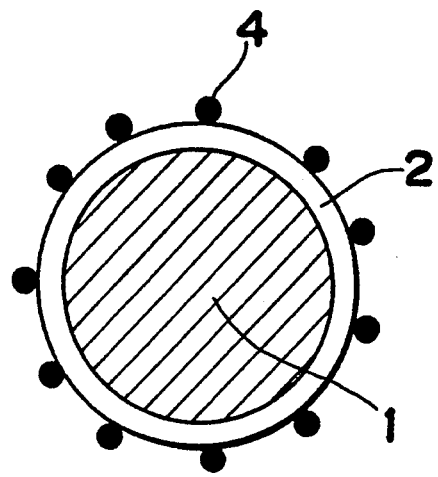
FIG. 3 shows a schematic sectional view of a resin-coated carrier having not pores.

A schematic sectional view of the resin-coated carrier having the pores is shown in FIG. 1 for easy understanding. A schematic sectional view of a resin-coated carrier having not pores is also shown in FIG. 3.

In FIG. 1, the number (1) shows a carrier core material, the number (2) shows a resin-coating layer and the number (3) shows pores formed on the resin-coating layer. The carrier shown in FIG. 3 has not the pores (3). The pores on the surface of carriers function to contact toner particles (4) with the carrier particles sufficiently and effect speedy electrification-build-up and uniform charging of toner (even though the toner particles are small). Toner scattering caused by poor charging can be prevented. It also effects the prevention of toner scattering that the pores on the carrier surface are excellent in trapping toner particles.

Further, the pores effect the prevention of toner particles from aggregation and the disintegrating of aggregated toner particles because the toner particles contact with the carrier particles frequently. Therefore, the problem of toner aggregation can be solved.

The pores on the surface of the resin-coated layer can be specified concretely by pore size distribution, mean pore size and total pore volume.

The desirable pore size distribution is within the range of 0.001–3 $\mu$m, preferably 0.001–2 $\mu$m, more preferably 0.005–2 $\mu$m. If the pore size is smaller than 0.001 $\mu$m, satisfactory effects can not be expected in the view point of toner disintegrating properties. If the pore size is larger than 3 $\mu$m, the toner-trapping properties become much strong, resulting in the deterioration of toner fluidity and developing properties.

The desirable mean pore size is within the range of 0.1–0.5 $\mu$m.

Thereby, the disintegrating properties of toner aggregation and the charging properties of toner can be improved.

The total pore volume can be expressed in two ways. The one has the unit (mg/g) referred to as one gram of carrier and the other has the unit (ml/ml) referred to as one milliliter of resin of coating layer.

The total pore volume (ml/g) referred to as one gram of carrier can be determined by mercury porosimetry. The desirable total pore volume (ml/g) is within the range of 0.001–0.1 ml/g, preferably 0.01–0.05 ml/g. If the volume is smaller than 0.001 (ml/g), the sufficient number of pores do not exist on the carrier surface, so that the effects caused by the pores may not be obtained. If the volume is larger than 0.1 ml/g, there exist so many pores that the coating layer becomes fragile.

The total pore volume (ml/ml) can be calculated from a specific gravity of coating layer and a filling ratio of carrier core material on the basis of the total pore volume (ml/g). The desirable total volume (ml/ml) is within 0.1–2 ml/ml, preferably 0.5–1.5 ml/ml. If the volume is smaller than 0.1 ml/ml, the sufficient number of pores do not exist on the carrier surface, so that the effects caused by the pores may not be obtained. If the volume is larger than 2 ml/ml, there exist so many pores that the coating layer becomes fragile.

Then, the components of the carrier of the present invention are explained hereinafter.

With respect to the carrier core material, which is one of elements of the carrier of the present invention, the one having a mean particle size of at least 20 $\mu$m in view of the prevention of adherence (scattering) of carrier particles to a supporter of an electrostatic latent image and at most 100 $\mu$m in view of the prevention of deterioration of image quality, for example the prevention of generation of carrier lines, is used. Concretely speaking, materials known as electrophotographic carriers for a two-component developer, for example, metals such as ferrite, magnetite, iron, nickel, cobalt, alloy thereof, a mixture thereof, alloys or mixtures of the above metals with metals such as zinc, antimony, aluminum, lead, tin, bismuth, beryllium, manganese, selenium, tungsten, zirconium, vanadium and the like, metal oxides such as iron oxides, titanium oxides, magnesium oxides and the like, nitrides such as chrome nitrides, vanadium nitrides and the like, and carbides such as silicon carbides, tungsten carbides and the like, ferromagnetic ferrites, and mixtures thereof, can be used.

The resins which are suitable to coat the carrier core materials may be exemplified by thermoplastic resins such as polystyrenes, poly(metha)acrylic resins, polyolefin resins, polyamide resins, polycarbonate resins, polyether resins, poly(sulfine acid) resins, polyester resins, epoxy resins, polybutyral resins, urea resins, urethane/urea resins, silicon resins, polyethylene resins, teflon resins and the like, thermosetting resins, a mixture thereof, copolymers thereof, block copolymers thereof, graft copolymers thereof, a blender thereof and the like. Resins having polar group may be used in order to improve chargeability.

In particular, the toner used in the combination with carrier is liable to be spent. Preferable coating resins are silicon resins or polyolefinic resins from the view point of release properties and prevention of spent toners.

The core material of carrier is coated by coating resin so that 70 percents or more, preferably 90 percents or more, still more preferably 95 percents or more of surface area of the cores may be coated. If the coating ratio is lower than 70 percents, characteristics of the carrier core material itself (unstable environmental resistance, reduction of electric resistance and unstable charging properties) strongly appear, so that the advantages of the coating with resins can not be obtained.

A content of carrier core material based on the carrier (hereinafter referred to as "filling ratio" by weight percent) is set at about 90 percents by weight or more, preferably 95 percents by weight or more. The filling ratio may be understood to show indirectly a layer-thickness of carrier coated with resin. If the filling ratio is lower than 90 percents by weight, the coating layer becomes so thick that, for example, the coating layer is separated, the charge amount being increased, the durability and the charging stability being not satisfactory. In view of the image quality, the fine line reproducibility is inferior and the image concentration is reduced, when the carriers are used as a developer.

The layer-thickness of coating resins may be indirectly expressed also by a true specific gravity. The true specific gravity of the carriers according to the present invention is greatly changed by a kind of carrier core material but it is set at about 3.5 to 7.5, preferably about 4.0 to 6.0, still more preferably about 4.0 to 5.5, so far as the carrier core material is used. If the specific gravity of the carriers is outside of the range, problems similar to those incidental to the carriers, which are not coated at the suitable content, occur.

An electric resistance of the resin-coated carriers with irregularities according to the present invention is set at about $1 \times 10^6$ to $1 \times 10^{14}$ ohm.cm, preferably about $10^8$ to $10^{13}$ ohm.cm, still more preferably about $10^9$ to $10^{12}$ ohm.cm. If the electric resistance is lower than $1 \times 10^6$ ohm.cm, the carriers are developed to deteriorate the image quality. In addition, if the electric resistance exceeds $1 \times 10^{14}$ ohm.cm, toners are electrically charged excessively so that the appropriate image concentration can not be obtained. It can be also thought that the electric resistance indirectly expresses the coating ratio with resins and the filling ratio of carrier core materials.

Figure 2:
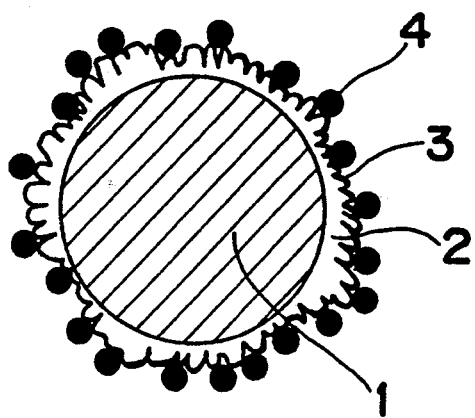
FIG. 2 shows a schematic sectional view of a carrier having pores on an irregular resin-coating layer.

In further preferable embodiment, the carrier used in the present invention is provided with irregularities. FIG. 2 shows such a carrier, in which pores (3) exist on the surface of irregular resin-coating layer (2). The irregular resin-coating layer improves electrification-build-up properties of toner, prevention of toner scattering, disintegrating properties of toner aggregation and the like.

The surface irregularity is explained in detail hereinafter.

The irregularity of the surface may be represented by the shape factor S represented by the following formula [I]:

$$S = \{(\text{outside circumference})^2/\text{area}\} \times \{1/(4\pi)\} \times 100 \qquad [I]$$

wherein the "outside circumference" is a mean value of outside circumferences of projected images of the carrier particles and the "area" is a mean value of projected areas of the carrier particles. Its preferable value S is 130 to 200. The value S represents a degree of irregularity of the surface of particles. The greater the degree of irregularity of the surface is, the further than 100 it shows.

The shape factor S can be measured, for example, by an image analyzer (Louzex 5,000 manufactured by Japan Regulator K.K.) but it has been observed that in general the measurement of the shape factor is independent upon a kind of image analyzers, so that the image analyzer used for the measurement of the shape factor S is not limited by the above described kind of image analyzer.

Additives, such as fine particles having a charge controlling function or electrically conductive fine particles, may be added to a resin layer in the present invention.

Concretely speaking, the fine particles having a charge controlling function include metal oxides, such as $CrO_2$, $Fe_2O_3$, $Fe_3O_4$, $IrO_2$, $MnO_2$, $MoO_2$, $NbO_2$, $PtO_2$, $TiO_2$, $Ti_2O_3$, $Ti_3O_5$, $WO_2$, $V_2O_3$, $Al_2O_3$, $MgO$, $SiO_2$, $ZrO_2$ and $BeO$, dyestuffs such as Nigrosine Base and Spilon Black TRH and the like.

The electrically conductive fine particles include carbon blacks, such as carbon black, acetylene black and the like, carbides, such as SiC, TiC, MoC, ZrC and the like, nitrides, such as BN, NbN, TiN, ZrN and the like, magnetic powders, such as ferrite, magnetite and the like.

The addition of metal oxides, metal fluorides and metal nitrides is effective for the further enhancement of the chargeability. Such the effect seems to be brought about by a synergism of the charging effects of the respective ingredients and the toners resulting from a contact of a complicated boundary surface formed with such the compounds, polyolefin and the core material with the toners.

The addition of carbon black is effective for the enhancement of the development and the obtainment of an image having a high image concentration and a clear contrast. It seems that the addition of the electrically conductive fine particles, such as carbon black, leads to a moderate reduction of electric resistance of the carriers and the well-balanced leak and accumulation of electric charge.

One of characteristics of the conventional binder type carriers consists in the superior reproducibilities of halftone and tone gradient. With respect to the coated carriers according to the present invention, the carriers superior in reproducibility of tone gradient are obtained by adding magnetic powders to the resin-coating layer. It seems that a surface composition similar to that of the binder type carriers is obtained by adding the magnetic powders to the resin-coating layer, whereby the chargeability and specific gravity approach to those of the binder type carriers.

The addition of borides and metal carbides is effective for electrification-build-up properties.

The size of the above additives, the additional quantity of the additives and the like are not specially limited so far as various kinds of characteristic of the carriers according to the present invention such as carrier form, coating ratio, electric resistance and the like described in the specification of the present invention, are satisfied. But, in relation to a method of producing the carriers according to the present invention, which will be mentioned later, the size of the fine particles may be allowed to such a degree that, for example, they are uniformly dispersed in resin solution or dehydrated hexane to be turned into a slurry without cohering. Concretely speaking, a volume mean particle size may be 2 to 0.001 $\mu$m, preferably 1 to 0.01 $\mu$m.

Also the quantity of the above additives can not be generally limited. But, 0.1 to 60 percents by weight, preferably 1.0 to 40 percents by weight, based on coating resins, is suitable.

In particular, when the filling ratio is adjusted to 90–97 percents by weight according to the present invention, it is preferable that the additives, such as the fine particles having a charge controlling function, the electrically conductive particles or the like are added into the resin-coating layer.

In the case where the filling ratio of carriers is small, i.e. about 90 percents by weight or less, namely when a coating layer is comparatively thick, a problem occurs. The reproducibility is reduced when the continuous copying of fine lines is conducted by the use of such the carriers. Such the problem, however, can be solved by adding the above additives.

Then, a production method of resin-coated carrier with pores is explained. The production method is not particularly limited so far as the carriers having the pores as above mentioned can be obtained. There are two preferable production methods.

One of the preferable methods is as follows. Fine particles which are soluble in an adequate solvent are dispersed in a resin solution in advance, the solution is applied to carrier particles to form a resin-coating layer, the carrier particles are dipped in a solvent which can dissolve the fine particles, and then the fine particles are eluted to form pores on the surface of carrier. In this preparation method, the pore size is dependent on particle size and dispersion degree of the fine particles.

With respect to fine particles, alkali metal halides, alkali earth metal halides, alkali metal hydroxides, alkali earth metal hydroxides, transition metal complexes and the like can be used. With respect to the solvents which can solve the fine particles, it is required not to dissolve the coating-layer.

In a particular embodiment, in the case where the resin-coating layer contains ferrite particles, the ferrite particles can be eluted by dipping in an acidic aqueous solution such as hydrochloric acid etc.. Thereby, the core are formed on the surface of carrier.

When the fine particles having a charge controlling function or the electrically conductive particles are added to the resin-coating layer, these additives are added to a resin solution for preparation of coating-layer at the same time. Ferrite and the like which can be used both for forming pores and for providing electrical conductivity are useful from productive and characteristic viewpoints.

The other preferable production method is a surface coating method by polymerization.

Such a surface coating method by polymerization can be carried out by polymerizing olefinic monomer such as ethylene on a carrier core material which is treated in advance with a highly active catalyst ingredient containing titanium and/or zirconium and soluble to hydrocarbon solvents in the presence of organic aluminum compounds. Fine particles having a charge controlling function and electrically conductive fine particles may be added at the formation of the resin-coating layer. For example, the method disclosed in U.S. Pat. No. 4,564,647 and in Japanese Patent Laid-Open No. Sho 60-106808 and Laid-Open No. Sho 60-106809 are suitable. The publication is herein cited as a part of the specification of the present invention. According to the coating method by polymerization, a coating layer excellent in durability is formed because of layer strength and adhesivity to core material.

When a coating layer is formed by the surface-coating method by polymerization, the pores above mentioned can be formed on the surface of carrier and in addition, the layer strength and the adhesivity of the coating layers to core materials are excellent enough to achieve durability of carriers.

The toners used in combination with the above described carriers are not specially limited. They include toners obtained by a pulverizing method, in which a thermoplastic resin, a coloring matter and/or a charging agent are (is) mixed, kneaded, pulverized and classified, toners obtained by a suspension polymerizing method, in which a coloring matter and/or a charging agent are (is) dispersed in monomers, and the resulting dispersions are polymerized, capsule toners obtained by covering a liquid containing a coloring matter, a low-softening point substance such as wax or a fixing resin and the like with a wall material (capsule shell) having a softening point higher than that of the ingredients, photoelectrically conductive toners with a coating layer made of a photoelectrically conductive substance on a surface thereof and the like. The toners having a mean particle size of about 3 to 20 $\mu$m are used.

In addition, a fluidizing agent may be added to the toners of the present invention. Silica, aluminum oxide, titanium oxide, a mixture of silica and aluminum oxide, a mixture of silica and titanium oxide and the like are used as the fluidizing agent. In particular, the mixture of silica and titanium oxide is preferably used. A ratio of silica to titanium oxide is set at 0.1 to 0.3 percents by weight/0.1 to 1 percents by weight in silica/titanium oxide and it is desirable that they are added to the toners in a quantity of 0.1 to 2 percents by weight. The fluidizing agent may be subjected to a hydrophobic treatment with a coupling agent or a surfactant.

The toners thus obtained are superior in electrification-build-up-properties of toners, prevention of scattering of toners and disintegrating properties of aggregated toners.

The toners are mixed with the carriers at 2 to 20 percents by weight, preferably 3 to 15 percents by weight, more preferably 4 to 12 percents by weight. If the toners are mixed with the carriers in a quantity of less than 2 percents by weight, a quantity of charge on toners is increased and thus a sufficient concentration of copied images can not be obtained. If the toners are mixed with the carriers in a quantity exceeding 20 percents by weight, an inside of the copying machine is polluted due to the scattering of toners, or a fogging by toners occurs on copied images.

The respective embodiments, in which the use of the above described resin-coated carriers of the present invention is particularly effective in the above described developing method, will be below described.

At first, we have a high-speed copying method in which two magnetic poles arranged oppositely to a photosensitive member have the same polarity (referred to as "magnetic pole system of same polarity").

However, in the magnetic brush developing method of magnetic pole system of same polarity, the developer is strongly stirred in the vicinity of and between the magnetic poles having the same polarity or a snowslide phenomenon of the developer occurs, so that the toners are liable to be scattered. Accordingly, if a quantity of charge of toners supplied onto the magnetic poles having the same polarity is insufficient or uneven, the poorly charged toners are scattered and thus a problem occurs in that, for example, an inside of the copying machine is soiled. In addition, the poorly charged toners have a bad influence, such as a fogging by toners, upon also the copied images and thus a problem occurs in that a quality of copied images is deteriorated. So, such the problem can be satisfactorily improved by using the above described carriers with a large number of fine pores on a surface thereof as a carrier composing a developer.

Figure 5:
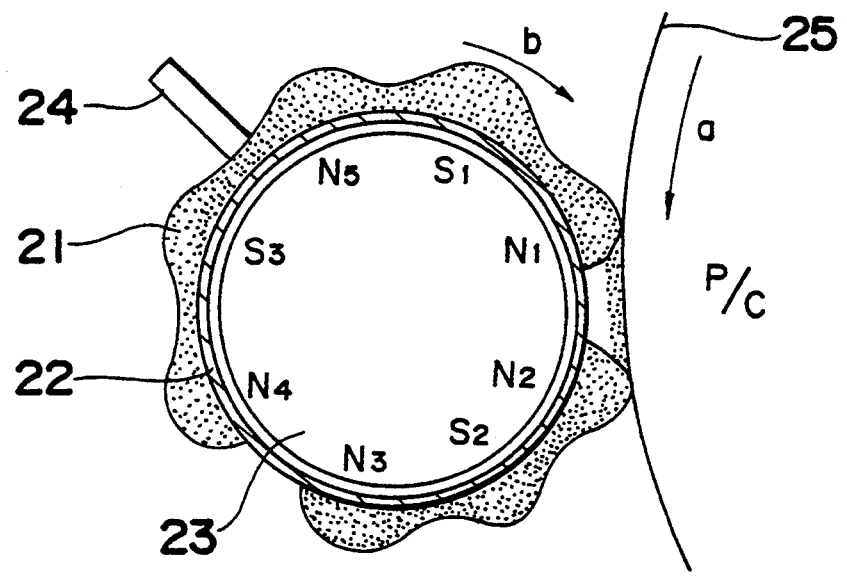
FIG. 5-FIG. 7 are to explain a method of developing an electrostatic latent image-developing method of magnetic pole system of same polarity.

An example of a concrete constitution of a method of developing an electrostatic latent-image developing method of magnetic pole system of same polarity is described with reference to FIG. 5. In FIG. 5, reference numeral (25) designates a photosensitive member (P/C). A developer-retaining member (a developing sleeve) (22) is arranged on the left side of the photosensitive member (25) at an appointed gap. A magnet member (23) is fixedly arranged within the developer-retaining member (22).

The developer-retaining member (22) is formed of a cylinder made of an electrically conductive nonmagnetic material and provided with fine concave portions formed on a surface thereof by a blasting treatment. The developer-retaining member (22) is arranged oppositely to the photosensitive member (P/C), which can be rotatably driven in the direction shown by the arrow (a), at an appointed developing gap and rotatably driven in a clockwise direction [direction shown by the arrow (b)]. A direct current bias power source (not shown) is usually provided between the developer-retaining member (22) and the earth.

The magnet member (23) fixedly housed within the developer-retaining member (22) comprises a plurality of magnets extending in an axial direction. Magnetic poles (N1, N2) having the same polarity are arranged next to each other in a portion opposite to the photosensitive member (P/C). Reference numeral (24) designates a developer-regulating member arranged at an appointed gap from the developer-retaining member (22).

With the above described constitution, a developer supplied onto the developer-retaining member (22) is held on the developer-retaining member (22) by a magnetic force of the magnet member (23) to be conveyed on the developer-retaining member (22) by a rotation of the developer-retaining member (22). The developer passes through a regulating gap between the developer-regulating member (24) and the developer-retaining member (22) to be transported at an appointed quantity toward a developing zone.

Figure 8:
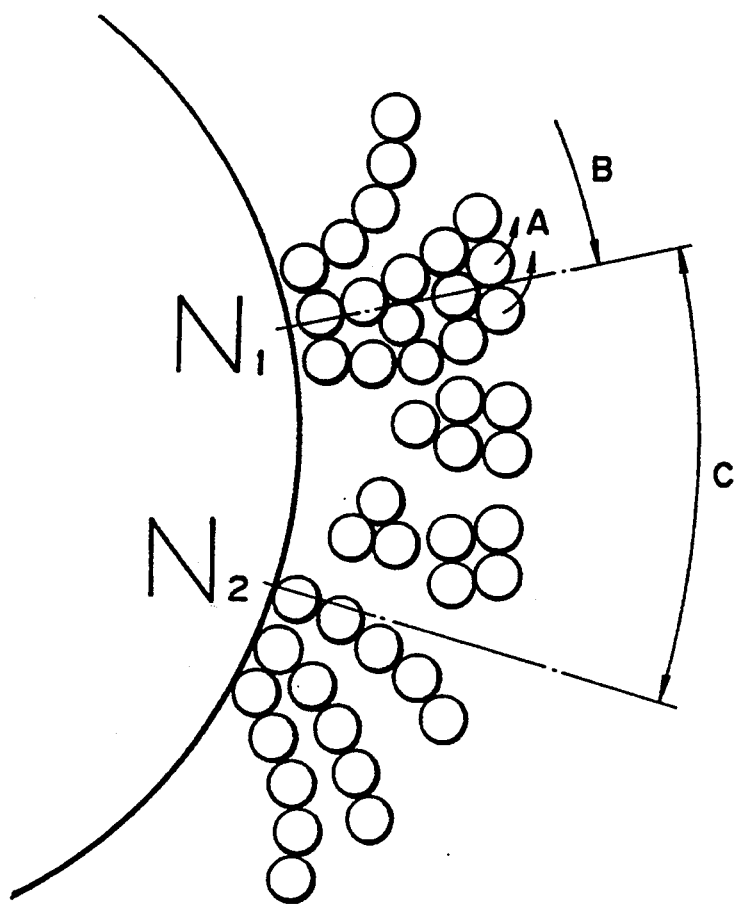
FIG. 8 is to explain a developing mechanism in a developing method shown in FIG. 5-FIG. 7.

The developer conveyed on the developer-retaining member (22) to arrive at the magnetic pole (N1) on the upstream side receives a force in the direction of A from a repelling magnetic field caused by the magnetic poles having the same polarity, as shown in FIG. 8. Simultaneously, the developer receives a force B to convey it downward by the rotation of the developer-retaining member (22), so that, when an appointed quantity or more of developer is charged on the magnetic pole (N1) on the upstream side, the developer can not be held by a magnetic force of the magnetic pole (N1) on the upstream side to begin to fall down toward the magnetic pole (N2) on the downstream side.

By adopting a constitution that the magnetic poles have the same polarity in such a manner, the developer is charged on the magnetic pole (N1) on the upstream side at a higher density and exists under the disturbed condition. In a zone C, a snowslide of the developer, the so-called cascade-like condition, occurs toward the magnetic pole (N2) on the downstream side, with the above described disturbed condition maintained.

Figure 6:
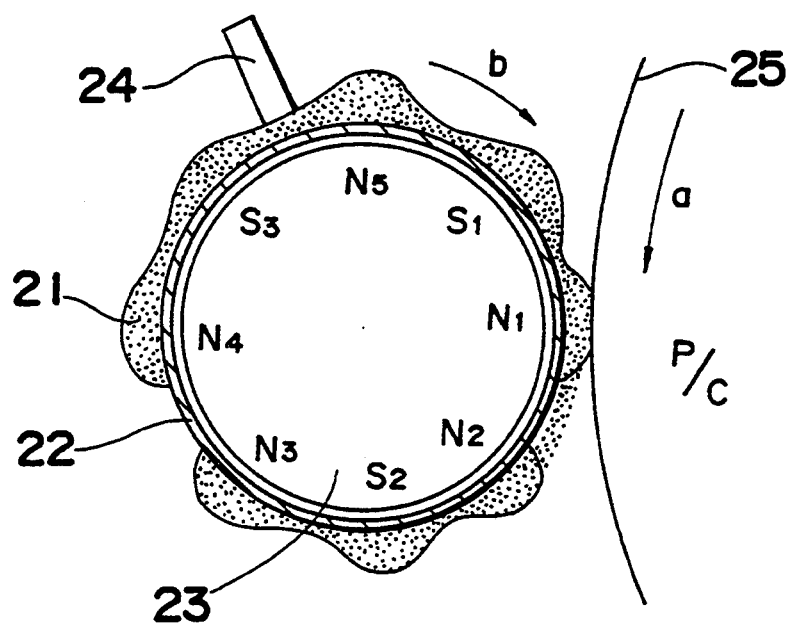
Figure 7:
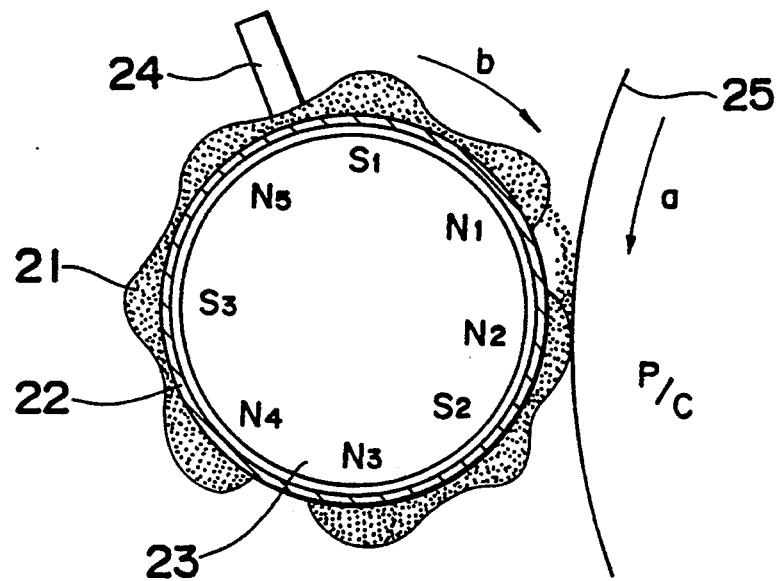

As to a constitution of an apparatus for developing an electrostatic latent image, it is sufficient that magnetic poles having the same polarity are arranged next to each other at a portion-opposite to a photosensitive member. As to a contact condition of a magnetic brush on the magnetic developer-retaining member with the photosensitive member, both magnetic brushes on magnetic poles (N1), (N2) may be brought into contact with the photosensitive member as shown in FIG. 5, or merely a magnetic brush on a magnetic pole (N1) on the upstream side in the direction, in which the developer-retaining member is rotated, may be brought into contact with the photosensitive member, as shown in FIG. 6 or merely a magnetic brush on a magnetic pole (N2) on the downstream side may be brought into contact with the photosensitive member adopted.

A developing efficiency can be improved by a developing on the magnetic pole on the upstream side, a cascade developing and a developing on the magnetic pole on the downstream side when both magnetic brushes on magnetic poles (N1), (N2) are brought into contact with the photosensitive member (FIG. 5). A developing efficiency can be improved by a developing by a developer accumulated on magnetic pole (N1) on the upstream side in a high density when merely a magnetic brush on the magnetic pole (N1) is brought into contact with the photosensitive member (FIG. 6). A developing efficiency can be improved by a cascade developing and a developing on the magnetic pole (N2) on the downstream side when merely a magnetic brush on the magnetic pole (N2) is brought into contact with the photosensitive member.

In the above described magnetic brush developing method of magnetic pole system of same polarity, the developer is violently stirred on the developer-retaining member (22) close to the magnetic poles having the same polarity and the cascade developing occurs, so that toners are liable to be scattered and spilled. In particular, a scattering and a spilling of toners are remarkably caused by an existence of poorly charged toners and aggregated toners. Problems of the scattering and spilling of toners can be improved by using the above described carriers with a large number of fine pores on a surface thereof as the carriers composing the developer.

A developing meeting high-speed copying requirements different from the above developing method of magnetic pole system of same polarity includes a method in which a plurality of developer-retaining members are provided in a portion opposite to a photosensitive member. According to this method, a problem that a sufficient quantity of toner can not be supplied to a developing zone within a short time and thus a concentration of image becomes insufficient, which occurs in the case where the usual developing method using a single developer-retaining member is applied to a high-speed copying, can be solved. However, according to such a developing method using a plurality of developer-retaining members, a contact area of the developer with the photosensitive member is increased in comparison with the method using a single developer-retaining member, so that a problem occurs in that the scattering of toners is increased and the fogging by toners is made violent.

In addition, the contact time of the toners with the carriers is shortened with an increase of copying speed, so that toners are not charged sufficiently and a quantity of poorly charged toners due to an uneven charging is increased. Such poorly charged toners are, in particular, liable to be scattered and thus the above described problem is grown larger.

The above described problem can be solved by using the above described resin-coated carriers as a carrier comprising the developer.

Figure 9:
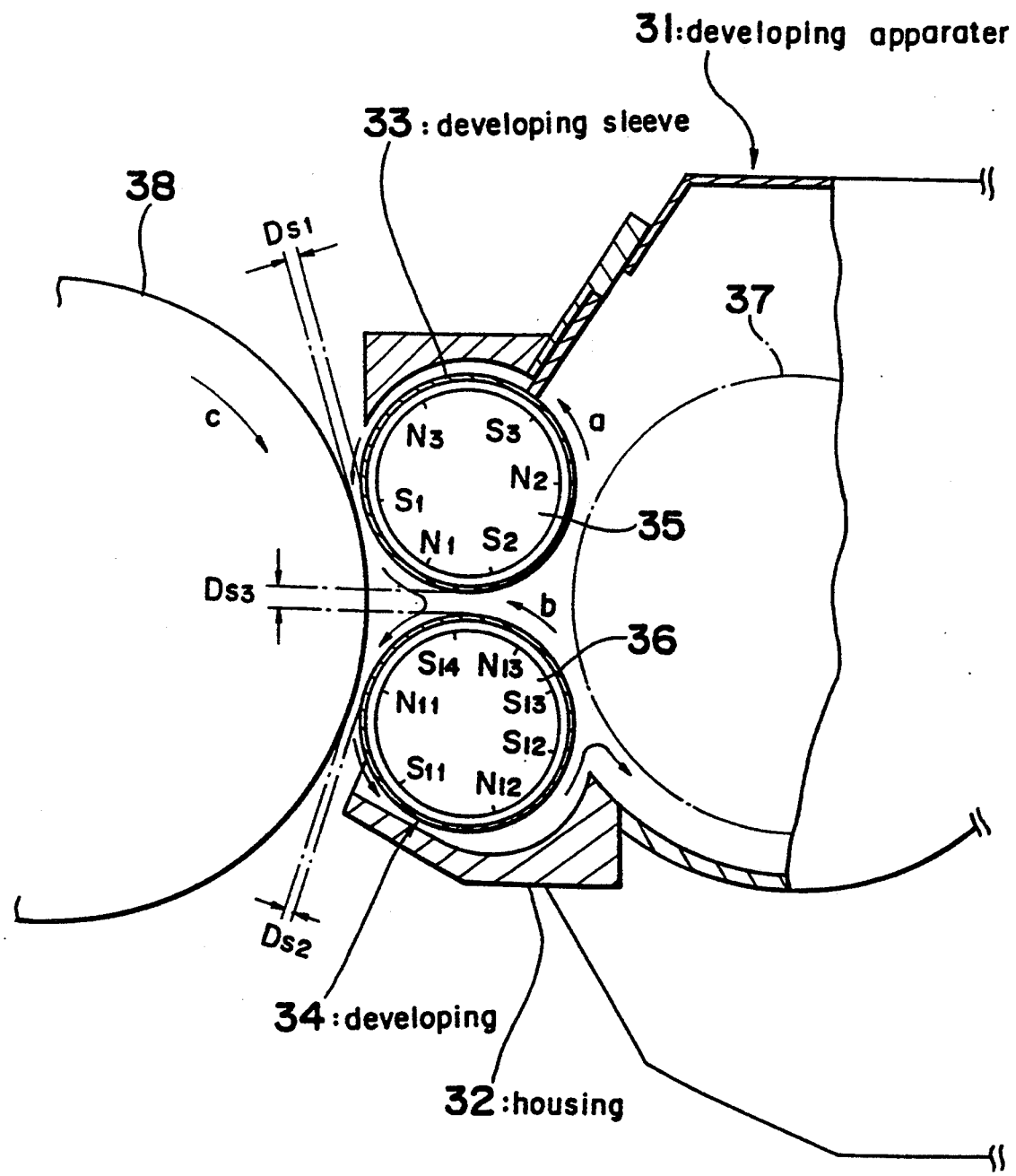
FIG. 9-FIG. 13 show respectively a schematic sectional view of one example of developing apparatus used for working a method of developing an electrostatic latent image.

FIG. 9 showing an example of the developing apparatus having two developer-retaining members.

A developing apparatus (31) comprises a housing (32), two developer-retaining members (two developing sleeves), that is, an upper developer-retaining member (33) and a lower developer-retaining member (34), arranged oppositely to a photosensitive member (38) within a housing (32) and a toner-supplying bucket (37) and a toner-housing tank (not shown) formed in rear of the developer-retaining members (33), (34).

The developer-retaining members (33), (34) are formed of a cylinder made of an electrically conductive nonmagnetic material and provided with fine concave portions formed by the blasting treatment on a surface thereof. The developer-retaining member (33).is arranged oppositely to the photosensitive member (38), which can be rotatably driven in the direction shown by an arrow (c), at an appointed developing gap (Ds$_1$) and rotatably driven in a counterclockwise direction [direction shown by an arrow (a)].

In addition, a direct current bias power source (not shown) is provided between the developer-retaining member (33) and the earth so that the minus side of a bias power source may be connected with the developer-retaining member to accumulate minus charges on a surface of the developer-retaining member (33) when an electrostatic latent image formed on the photosensitive member (38) to be developed has a negative polarity.

A magnet member (35) housed within the developer-retaining member (33) comprises a plurality of magnets with a magnetic pole extending in an axial direction and fixed under the condition shown in FIG. 9.

Another developer-retaining member (34) is arranged oppositely to the developer-retaining member (33) at an appointed gap (Ds$_3$) (in usual about 1 to 2 mm) below the developer-retaining member (33). The developer-retaining member (34) is positioned oppositely to the photosensitive member (38) at an appointed developing gap (Ds$_2$) so as to be rotatably driven in the same direction as the upper developer-retaining member [the direction shown by an arrow (b)]. The developing gap (Ds$_2$) is usually same as the gap (Ds$_1$). In addition, the developer-retaining member (34) is connected with a bias power source (not shown) in the same manner as the upper developer-retaining member (33) so as to apply a bias voltage having the same polarity as that applied to the developer-retaining member (33) to a surface of the developer-retaining member (34).

With the above described constitution, a developer supplied onto the developer-retaining member (33) from a toner-supplying bucket (37) is held on the developer-retaining member (33) by a magnetic force of the magnet member (35) to be conveyed one after another in the order of $N_2 \rightarrow S_3 \rightarrow N_3 \rightarrow S_1$ on the developer-retaining member (33) by a rotation of the developer-retaining member (33). Upon arriving at a developing zone, the developer is brought into contact with the photosensitive member (38) to develop an electrostatic latent image formed on the photosensitive member (38). The developer, which has passed through the developing zone, is further conveyed on the developer-retaining member (33) and then transferred onto a magnetic pole $S_{14}$ of the lower developer-retaining member (34) followed by being conveyed on the lower developer-retaining member (34) in the order of $S_{14} \rightarrow N_{11}$ and being brought into contact with the photosensitive member (38) again to develop an electrostatic latent image on the photosensitive member (38).

Unless the developer is surely transferred from the magnetic pole $N_1$ on the upper developer-retaining member (33) to the magnetic pole $S_{14}$ on the lower developer-retaining member (34), an appointed quantity of developer does not flow, so that, for example, the developer is stayed on the upper developer-retaining member and thus the developer accumulates between the photosensitive member and the developer-retaining members. As the lower developer-retaining member becomes short of the developer, a concentration of the copied image is reduced.

Accordingly, in order to make the transference of the developer from the upper developer-retaining member (33) to the lower developer-retaining member (34) sure and smooth, the lower magnetic pole S is arranged oppositely to the upper magnetic pole N in a transfer zone and additionally magnetic forces are set so that magnetic force $N_1$ may be smaller than that of $S_{14}$.

The developer on the lower developer-retaining member (34) is further conveyed in the order of $N_{11} \rightarrow S_{11} \rightarrow N_{12} \rightarrow S_{12}$. The developer is collected and supplied again onto the upper developer-retaining member (33) again from the bucket (37).

On the other hand, some developing particles, which have not been drawn toward the upper developer-retaining member (33), remain on the developer-retaining member (34) and further transported to the magnetic poles $N_{13}$, $S_{13}$ of the lower developer-retaining member (34). In such the case, in order to prevent the developer from passing through between the upper developer-retaining member and the lower developer-retaining-member to be conveyed in the order-of $N_{13} \rightarrow S_{14}$, a magnetic pole $S_2$ is arranged oppositely to a magnetic pole $N_{13}$ to transfer the developer stuck to the lower developer-retaining member (34) onto the magnetic pole $S_2$ of the upper developer-retaining member from the magnetic pole $N_{13}$. At this time, in order to make the transference of the developer from the magnetic pole $N_{13}$ to the magnetic pole $S_2$ sure and avoid the problem due to the remaining developer on the lower developer-retaining member (34), the magnetic poles $S_2$, $N_{13}$ are arranged so that a magnetic force of the magnetic pole $S_2$ may be larger than that of the magnetic pole $N_{13}$.

In the above described developing method, toners in the developer are electrically charged mainly by friction with carriers. That is to say, it is necessary that the toners are charged by friction with the carriers within a short time until the developer is conveyed to the developing zone close to the magnetic pole $S_1$ after it is supplied onto the magnetic pole $N_2$ of the upper developer-retaining member (33) from the bucket (37). So far as the conventional carriers are used, it is difficult to give an optimum quantity of charge to the toners within such a short time and thus poorly charged toners and unevenly charged toners are produced. In addition, the developer is brought into contact with the photosensitive member two times and the developer-retaining members (33), (34) are rotated at high speed in the high-speed copying system, so that the developer is violently disturbed and thus the toners are liable to be scattered. In particular, the poorly charged toners are liable to be scattered and the scattered toners have problems such as a foggs in copied images and a pollution of a copying machine.

Such problems are solved by using the above described resin-coated carriers with a large number of fine pores on a surface thereof as a carrier.

In addition, another embodiment of the developing method comprising a developer-retaining member including a plurality of magnets with magnetic poles in an axial direction and a toner-supplying roller in the vicinity of the developer-retaining member has been proposed. In this method, a two-component developer composed of carrier and toner is prepared on a circumferential surface of the developer-retaining member and the developer is conveyed to a portion opposite to an electrostatic latent image-retaining member while the developer is hold in the form of magnetic brush by a magnetic force of the magnet member. And then, a toner image corresponding to an electrostatic latent image on the electrostatic latent image-retaining member is formed.

And, in the developing method of this type, the developer-retaining member must be supplied with the toners of a quantity corresponding to their consumption to keep a concentration of toners in the developer constant, so that the toners held on a circumferential surface of a toner-supplying roller are scraped off by means of a magnetic brush on the developer-retaining member to supply the developer-retaining member with the toners of a quantity corresponding to their consumption in the development while a quantity of the toners to be supplied onto the developer-retaining member is controlled on the basis of a differential voltage between the developer-retaining member and the toner-supplying roller.

And, in this developing method, a charging of optimum level required for developing the toners from the developer-retaining member to the electrostatic latent image is carried out by a frictional charging of the toners with the carriers during the time from a point of time when the developer-retaining member is supplied with the toners from the toner-supplying roller to prepare the two-component developer composed of carriers and toners on a circumferential surface of the developer-retaining member till a point of time when the developer is conveyed to an electrostatic latent image-developing zone.

However, this period is short and a quantity of carriers held on the developer-retaining member is small, so that it is difficult to secure a mixing and stirring action sufficient for charging the toners to the optimum level and thus the poorly charged toners and the unevenly charged toners are liable to be produced. The poorly charged toners are liable to be scattered and thus problems occur in that, for example, an inside of the copying machine is soiled. In addition, a fogging by toners occurs to have a bad influence upon copied images. Accordingly, the developer used in the above described method must charge the toners to the optimum level with a small quantity of carriers within a short time and use the carriers superior to the conventional carriers in electrification-build-up-properties.

In addition, in the developing method of this type, the toners can not be sufficiently and mechanically mixed and stirred and further the aggregated toners can not be sufficiently mixed and disintegrated by mixing and stirring on the developer-retaining member for a short time, so that a problem has occurred in that, for example, the toners are spilled.

An example of a developing apparatus embodying the above described method of developing an electrostatic latent image will be explained below with reference to FIG. 10.

Figure 10:
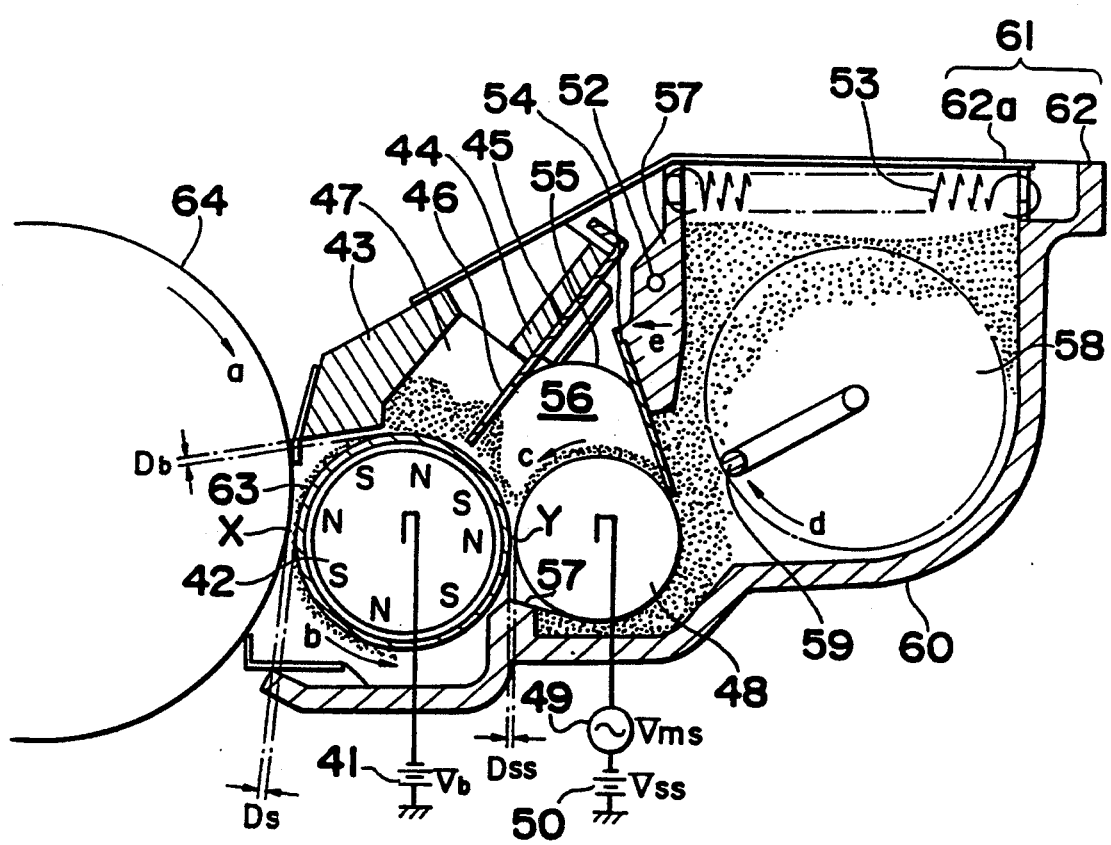

FIG. 10 shows a developing portion of a copying machine provided with a developing apparatus (60). The developing apparatus (60) is arranged in the adjoining portion of a photosensitive member (64) and an electrostatic latent image formed by charging and exposing a surface of the photosensitive member (64) supplied with toners to turn the electrostatic latent image into a visible image.

The developing apparatus (60) comprises a developer-retaining member (a developing sleeve) (63) and a toner-supplying roller (48) arranged in the order rightward from the photosensitive member (64) in a developing tank (61) mainly composed of a casing (62) and a cover (62a) and a toner-accommodating tank (58) arranged in rear of the toner-supplying roller (48).

The developer-retaining member (63) is a cylindrical member formed of an electrically conductive nonmagnetic material, such as aluminum, with fine concave portions formed on a surface thereof by a blasting treatment and arranged oppositely to the photosensitive member (64) rotatably driven in the direction shown by an arrow (a) with a developing gap (Ds) between it and the photosensitive member (64). The developer-retaining member can be rotatably driven in a counterclockwise direction [direction shown by an arrow (b)].

In addition, a direct current developing bias power source (41) (voltage: Vb) is connected between the developer-retaining member (63) and an earth. Referring to FIG. 10, a minus side of the power source (41) is connected with the developer-retaining member (63) so that minus charges may be accumulated on the surface of the developer-retaining member (63).

A magnet member (42) housed within the developer-retaining member (63) comprises a plurality of magnets with magnetic poles extending in an axial direction so that a S pole and a N pole may be alternately fixedly arranged in an outer circumferential portion, as shown in FIG. 10.

A main developer-stirring plate (43) mounted on the cover (62a) is arranged oppositely-to an upper portion of the developer-retaining member (63) with a height-regulating gap (Db) between it and the portion. In addition, an auxiliary developer-stirring plate (45) mounted on a support portion (44) of the cover (62a) is opposite to a portion above in an obliquely rightward direction from the developer-retaining member (63) to form an empty room (47) above the developer-retaining member (63) together with the main developer-stirring plate (43).

In addition, the auxiliary developer-stirring plate (45) is provided with a slit (46) formed in an axial direction of the developer-retaining member (63).

The toner-supplying roller (48) is made of an electrically conductive nonmagnetic material, such as aluminum, with fine concave portions formed on a surface thereof and arranged in parallel to the developer-retaining member (63) with a supply gap (Dss) between it and the developer-retaining member (63) on the rear side of the developer-retaining member (63). The toner-supplying roller can be rotatably driven in a direction shown by an arrow (c).

In addition, this toner-supplying roller (48) is earthed through an alternate current power source (49) and a direct current power source (50). As a result, a oscillating bias voltage, in which an alternate current is overlapped on a direct current, is applied to the toner-supplying roller (48).

A partition wall (51) is provided above the rear side of the toner-supplying roller (48) so as to be rotatable with a shaft (52) as a center and provided with a pressurizing spring (53). The one end of the pressuring spring (53) is connected on an upper rear end portion of the developing tank (61). The other end of the pressurizing spring (53) is connected with the upper end portion of the partition wall (57). The upper end portion of the partition wall (57) is always pressed in the direction shown by an arrow (e), whereby a metal blade (54), which is mounted on a lower portion of the partition wall (57), is brought into contact with the toner-supplying roller (48).

In addition, the metal blade (54) is connected with the auxiliary developer-stirring plate (45) through a sheet (55) so that these may form an empty room (56) above the toner-supplying roller (48).

Furthermore, a toner return-preventing film (57), which is mounted on the casing (62), is brought into pressurized contact with the toner-supplying roller (48) along a direction of rotation of the toner-supplying roller (48) below the toner-supplying roller (48).

Said toner-housing tank (58) is formed by partitioning a rear portion of the developing tank (61) by means of the partition wall (51), the metal blade (54), the toner-supplying roller (48) and the toner return-preventing film (57). A stirring rod (59) is provided within the toner-housing tank (58) so as to be rotatably driven in a direction shown by an arrow (d).

In the developing apparatus having the above described constitution, at first a starter comprising a mixture of the resin-coated carriers and positively chargeable insulating toners is put into the empty room (47) above the developer-retaining member (63). The same insulating toner is put into the toner-housing tank (58). In this time, the empty room (47) maybe charged with merely the resin-coated carriers in place of the starter.

Upon switching on a print switch (not shown) under the above described condition that the resin-coated carriers and the toners are put into the empty room (47), the developer-retaining member (63), the toner-supplying roller (48) and the stirring rod (59) are rotated in the direction shown by the arrow (b), (c) and (d) respectively.

When the developing apparatus (60) is operated in the above described manner, in a bottom portion of the toner-housing tank (58) the toners flow toward the toner-supplying roller (48) by a stirring action of the stirring rod (59) to be taken in the fine concave portions formed on the surface of the toner-supplying roller (48). Thereby, the toners are provided for the toner-supplying roller (48).

The toners supplied to the toner-supplying roller (48) are conveyed in the direction shown by the arrow (c). An excessive quantity of toners is scraped off by means of the metal blade (54) and simultaneously the toners are previously charged by their contact with the metal blade (54) to arrive at a portion [a toner supply-zone (Y)] opposite to the developer-retaining member (63).

In the toner supply zone (Y), the developer held on the developer-retaining member (63) is supplied with the toner, while the excessive quantity of toners on the developer-retaining member (63) is collected onto the toner-supplying roller (48). By the way, this operation of supplying and collecting the toners will be mentioned later.

The toners supplied onto the developer-retaining member (63) are conveyed in the direction shown by the arrow (b) along with the carriers held on the circumferential surface of the developer-retaining member (63) and the most of the developers are dammed up by means of the auxiliary developer-stirring plate (45).

And, the developers are pushed by developers which are successively conveyed. The developers are warped up along the auxiliary developer-stirring plate (45) and returned to the empty room (56). The partial developers pass through a gap between the auxiliary developer-stirring plate (45) and the developer-retaining member (63) to arrive at the empty room (47) on the downstream side.

The developers, which have arrived at the empty room (47), are dammed up by means of a main developer-stirring plate (43). The developers are warped up with rotating in a counterclockwise direction within the empty room (47) along the main developer-stirring plate (43). The developers flow backward to be joined with the developers passing through the slit (46) and thus mixed.

A part of thus mixed and stirred developers passes through the height-regulating gap (Db) between the main developer-stirring plate (43) and the developer-retaining member (63) to form a magnetic brush. The magnetic brush slidingly rubs the surface of the photosensitive member (64) within a developing zone (X) to develop an electrostatic latent image on the surface of the photosensitive member (64). Thereby, electrostatic latent images are turned into a sensible image.

The toners are charged by mainly their friction with the carriers during a short time when they are conveyed from the toner supply zone (Y) to the empty rooms (56), (47). However, according to the present invention, the use of the resin-coated carriers with fine pores on the surface thereof can sufficiently secure a contact between the toner particles and the carrier particles and thus electrification-build-up-speed of toners can be increased and the respective toner particles can be sufficiently uniformly charged. Thereby, a scattering of toners due to a poor charging can be prevented.

Besides, the fine pores on the surface of carriers can satisfactorily catch the toner particles, so that the scattering of toners can be effectively prevented also in view of this point.

In addition, the existence of fine pores leads to a frequent contact of the toners with the carriers and thus not only a prevention of the toners from being-aggregated but also a crushing of aggregated toners are effected. As a result, in particular, a problem of aggregated toners resulting from reduced diameters of toners can be solved.

After passing through the developing zone (X), the developers remaining on the circumferential surface of the developer-retaining member (63) are successively conveyed in the direction shown by the arrow (b) by the rotation of the developer-retaining member (63) to arrive at the toner supply portion (Y). A supplying operation and a collecting operation of toners are conducted between the developer-retaining member (63) and the toner-supplying roller (48).

And, when the toners, which are supplied to the developer-retaining member (63), arrive at the empty rooms (56), (47) again, the developers, which are sufficiently mixed and stirred here, are uniformly replenished on the surface of the developer-retaining member (63) to eliminate a consumption pattern of the toners which have been consumed in the last development.

On the other hand, when the toners, which have been collected in the toner-supplying roller (48), enter the fine concave portions of the toner-supplying roller (48) and pass between the toner-supplying roller (48) and the toner return-preventing film (57) to arrive at the toner-housing tank (61), the fine concave portions are replenished with toners again.

A supplying operation and a collecting operation of toners in the toner supply zone (Y) will be below described.

In the toner supply zone (Y), the developers are tied in a row along a magnetic field formed in a radial direction from the magnetic pole (N) of the magnet member (42) to form the magnetic brush on the developer-retaining member (63). On the other hand, the fine concave portions on the surface of the toner-supplying roller (48) are filled with preliminarily charged toners. Since a bias voltage (Vss+Vfms), in which the alternate current power source (49) is overlapped on the direct current power source (50), is applied to the toner-supplying roller (48), the charged toners are vibrated toward the developer-retaining member (63) in accordance with a cyclic change of the alternate current power source (Vfms) on the surface of the toner-supplying roller (48).

Accordingly, the toners are frequently brought into contact with the magnetic brush to be scraped off by the magnetic brush at a high efficiency.

In the case where a voltage value of the alternating current voltage (Vrms) applied is 300 V or more and a frequency is within a range of 20 Hz to 2 KHz, the present invention can be effectively put into practice.

In addition, a so-called sine wave alternating current power source and non-sine wave alternating current power sources, such as pulse wave alternating current power sources, such as pulse wave alternating current power source and triangular wave alternating current power source, may be used as the alternating-current power source.

On the other hand, the excessive toners, which have been brought into contact with the carriers to be positively charged on the developer-retaining member (63), are electrically drawn toward the toner-supplying roller (48) by a difference between a bias voltages applied to the developer-retaining member (63) and the toner-supplying roller (48) and also the drawing power is periodically changed under an influence by the alternating current power source (49), so that an electrostatic attraction is produced between the excessive toners and the carriers to make a separation of the excessive toners easy and thus the excessive toners can be collected in the toner-supplying roller (48) at a high efficiency.

As above described, a quantity of toner supply and toner collection is increased to reduce a fluctuation of toners in quantity between the developer-retaining member (63) and the toner-supplying roller (48), so that a quantity of toners conveyed to the developing zone (x) is stabilized to be able to obtain a copied image having no uneven concentration.

And, when the toners, which have been collected in the toner-supplying roller (48), enter the fine concave portions of the toner-supplying roller (48) and pass between the toner-supplying roller (48) and the toner return-preventing film (57) to arrive at the toner-housing tank (58), the fine concave portions are replenished with toners again.

In addition, a method, in which an alternating current voltage is additionally overlapped on a developing bias voltage, has been known as one preferred embodiment of a developing method. In such a developing method, an adhesion of toners to an electrostatic latent image and a development of toners are carried out in a vibrating electric field in order to obtain a high-quality image.

In general, if a bias voltage with an alternating current component overlapped is applied as a developing bias to form a vibrating electric field and developers are used in this vibrating electric field, the developers can be more efficiently stirred due to a vibrating phenomenon in comparison with the case where merely a direct current bias voltage is applied as a bias voltage.

Accordingly, if the toners supplied to a developing zone are poor or uneven in quantity of charges, the toners are scattered by the vibrating phenomenon to bring about a fogging by toners and a pollution of an inside of apparatus. Consequently, it is necessary that the toners are uniformly charged to a suitable level in order to supply them to the developing zone. If electrification-build-up-properties of carriers are insufficient, the toners can not be charged to the suitable charging level within a time until they arrive at the developing zone. Thereby, problems occur in, for example, a scattering of toners, a fogging by toners and a deterioration of image in quality.

In addition, some-toner particles of the developer are aggregated and the aggregated toners can not be sufficiently charged within a time until they arrive at the developing zone and thus they can not be appropriately developed into an electrostatic latent image. Therefore, a copied image is liable to be deteriorated in quality. If the aggregated toners are supplied to developing zone, a problem occurs also in that the developer is spilled from the developing zone. The less the diameter of toners is, the more liable the aggregation of toners is. Accordingly, it is necessary to sufficiently disintegrate the aggregated toners to be supplied to the developing zone.

A bias voltage applied to the developer-retaining member may be overlapped with an alternating current component. In this developing method, electrostatic latent images on the surface of a photosensitive member are developed while the developer is subjected to a vibrating and stirring action in a vibrating electric field formed between the developer-retaining member and the photosensitive member.

An alternating current component applied as the developing bias must have a frequency (f) of 1000 to 3500 Hz and a peak to peak voltage (Vp-p) of 300 to 2500 V and meet the following formula [I] between the frequency (f) and the peak to peak voltage (Vp-p):

$$Vp\text{-}p \leq f + 500 \qquad [I]$$

If the frequency (f) is less than 1000 Hz, copied images are roughened. In addition, a striped pattern is produced on copied images at low frequencies of 500 Hz or less. If the frequency (f) is higher than 3500 Hz, a vibration of toners can not follow the vibration of electric field, so that an application of the alternating current component becomes ineffective.

Furthermore, if the peak to peak voltage is less than 300 V, a sufficient vibration can not be given to the toners and thus the application of the alternating current component becomes ineffective. If the peak to peak voltage is larger than 2500 V, a fogging by toners occurs. In the case where the frequency (f) and the peak to peak voltage do not satisfy a relation expressed by the formula [I], a fogging by toners occurs. The developer used in the present invention becomes more useful by using it in the vibrating electric field having the frequency of 1000 to 3000 Hz and the Vp-p of 500 to 2000 V and meeting the formula [I].

The development of the electrostatic latent image by the developers held on the developer-retaining member in the developing zone is carried out by a contact developing method, in which an electrostatic latent image retaining-member is brought into contact with a magnetic brush, a fly developing method, in which the electrostatic latent image is not brought into contact with the magnetic brush, and the like.

Figure 11:
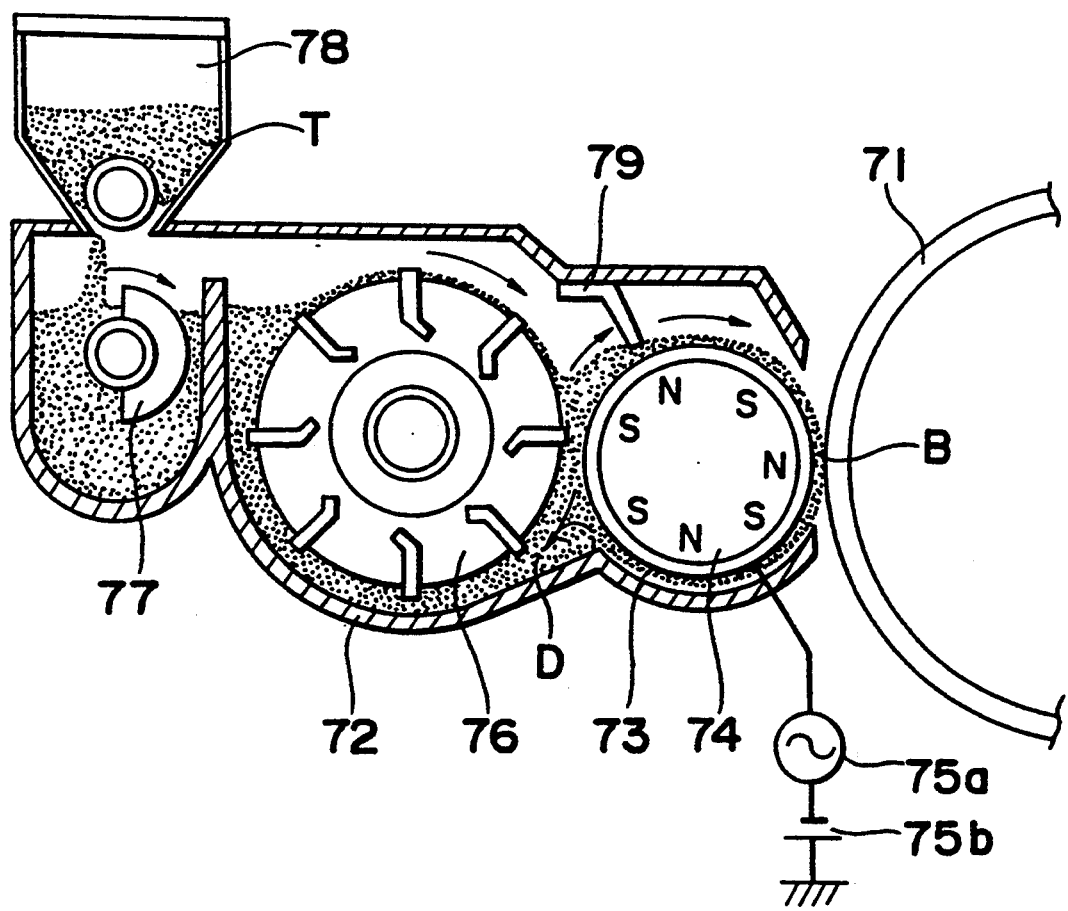

One example of a developing apparatus in which a alternating current voltage is overlapped on the direct current bias voltage applied to a developer-retaining member is shown in FIG. 11.

Referring to FIG. 11, reference numeral (72) designates a developing apparatus, reference numeral (71) designating a photosensitive member, reference numeral (73) designating a developer-retaining member (a developing sleeve), reference numeral (74) designating a magnet member, reference numeral (76) designating a bucket roller, reference numeral (77) designating a spiral screw, reference numeral (78) designating a toner hopper, reference numeral (79) designating a layer thickness-regulating blade, reference mark (D) designating a developer, and reference mark (T) designating a toner.

In the developing apparatus having the above described constitution, a bias voltage, in which an alternating current component (75a) is overlapped on a direct current component (75b), is applied to a developer-retaining member (73). Said developers (D) in the developing apparatus (72) are mixed and stirred by means of the spiral screw (77) and the bucket roller (76) which are rotated in a direction shown by an arrow. The mixed and stirred developers are supplied onto the developer-retaining member (73) and then conveyed in a direction shown by an arrow by a rotation of the developer-retaining member (73). The developers are regulated to an appointed layer-thickness by means of the layer thickness-regulating blade (79) and the arrive at a developing zone (B) to develop an electrostatic latent image on a surface of the photosensitive member (71).

In the present developing method, a scattering of toners, a spilling of toners and the like are liable to occur in the developing zone (B) but electrification-build-up properties of toners can be effectively improved and a sufficient and appropriate charging to toners can be effectively achieved by using the above described developers of the present invention. In addition, the toners are not aggregated, so that the scattering of toners, the spilling of toners, a fogging by toners and the like can be prevented.

In every developing method above described, the excessive fractions of the developers supplied onto the developer-retaining member are dammed up by means of the regulating blade to regulate the layer-thickness of developers on the developer-retaining member.

Accordingly, the developers stay in the vicinity of the regulating blade to come into collision with the developers which are successively conveyed on the developer-retaining member. Thereby, the staying developers are subjected to the mixing and stirring action. This mixing and stirring action based on the stay of the developers in the vicinity of the regulating blade has led to not only the frictional charging of the toners with the carriers but also the problem that the deterioration of the developers is accelerated on account of the strong shock and frictional resistance among the developers themselves.

In order to solve such a problem, a mechanism for returning the developers staying in the vicinity of the regulating blade to the developing vessel and the like by the suitable means has been proposed. The constitution having such a mechanism can prevent the developers from staying in the vicinity of the regulating blade and thus being subjected to the strong mixing and stirring action. Thereby, the problem that the developers are early deteriorated, can be eliminated.

On the contrary, the lowered mixing and stirring action for the developers leads to the lowered frictional chargeability of the toners with the carriers and thus the formation of the poorly charged toners due to the uneven charging of the toners. Such toners are liable to be scattered, the pollution of the inside of the developing vessel and the like.

For the easy understanding, one example of a developing apparatus having a returning mechanism of toners staying in the vicinity of toner-regulating blade will be below described with reference to FIG. 12.

A developing device (82) is arranged by the side of a photosensitive member (81). An electrostatic latent image for a copied image formed by charging and exposing a surface of the photosensitive member (81) is supplied with toners to visualize the electrostatic latent image.

Said developing apparatus (82) generally comprises a developing tank composed of a casing (88) and a cover (89), a developing roller (83) and a bucket roller (84) arranged in the order leftward from the photosensitive member (81) within the developing tank and a toner hopper (85) arranged in rear of a leftward oblique upper portion of the bucket roller (84).

Said developing roller (83) comprises a developer-retaining member (83a) and a magnet member (83b) disposed within the developer-retaining member (83a).

The developer-retaining member (a developing sleeve) (83a) is a cylindrical member made of an electrically conductive nonmagnetic material and arranged oppositely to the photosensitive member (81) rotatably driven in a direction shown by an arrow (a) with an appointed developing gap (Ds) from the photosensitive member (81) so as to be rotatably driven in a clockwise direction [direction shown by an arrow (b)]. The developer-retaining member (83a) having grooves on a surface thereof or a surface roughness (Rz) of 2 to 100 μm is preferably used. Such a surface condition is preferable in that a quantity of developers conveyed on the developer-retaining member (83a) can be increased and a concentration of copied images or a uniformity of the concentration of copied images can be improved.

Figure 12:
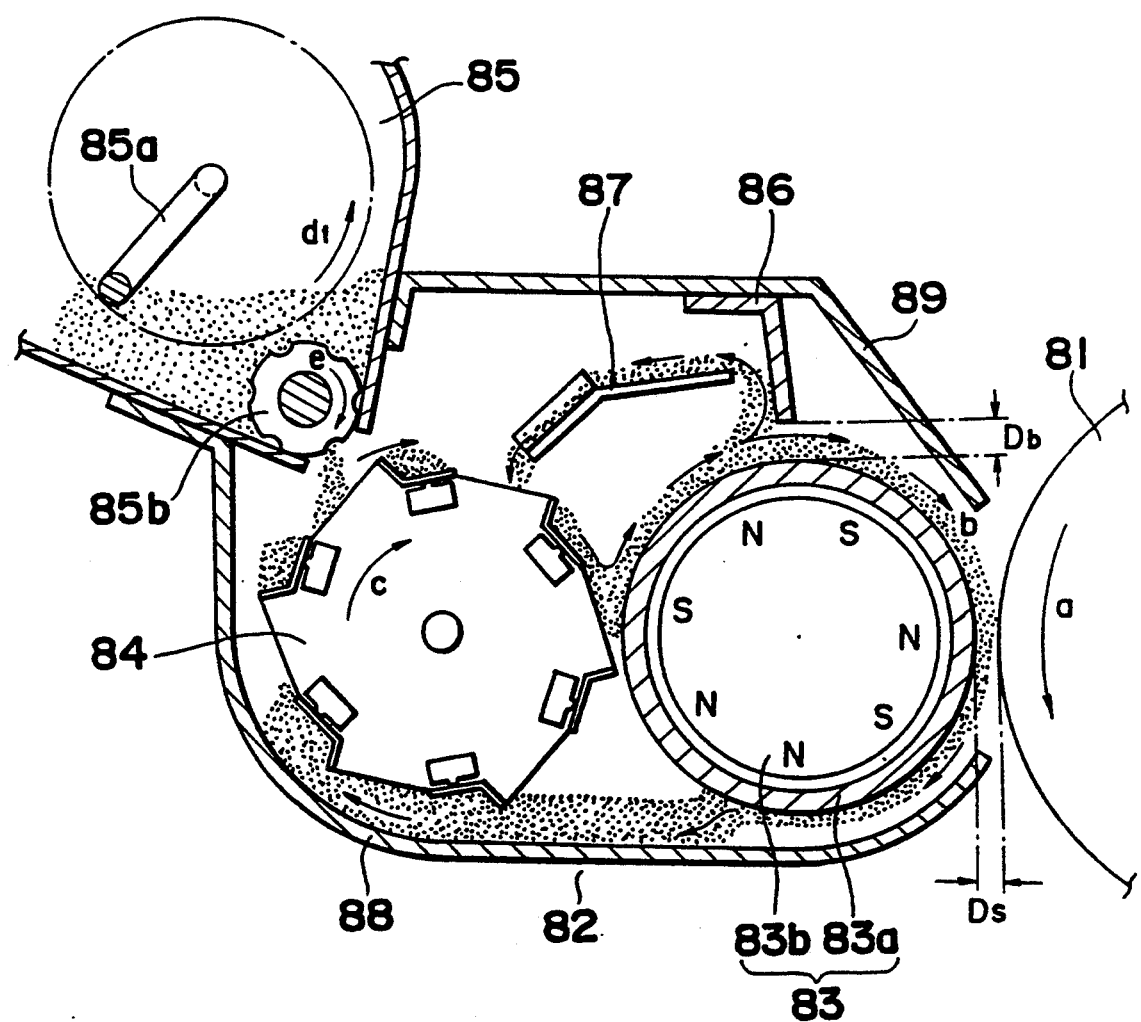

Said magnet member (83b) housed within the developer-retaining member (83a) comprises a plurality of magnets with magnetic poles extended in an axial direction fixed under the condition shown in FIG. 12.

The bucket roller (84) arranged on the left side of the developing roller (83) has a constitution that a plurality of almost L letter-shaped buckets are concentrically fixed and is rotatable in a direction shown by an arrow (c) for mixing, stirring, conveying and supplying a developer (a mixture of carriers and toners) on the developer-retaining member (83a).

Said toner hopper (85) contains replenishing toners housed therein and the toners in the toner hopper are stirred and conveyed by means of an agitator (85a) and a required quantity of toners is replenished in the bucket roller by a rotation of a replenishing roller (85b) having grooves and being positioned in a lower portion of the hopper. As to a method of replenishing toners, we have a spot replenishment, a line replenishment and the like but the line replenishment is preferably carried out in respect of dispersibility of the replenishing toners.

A regulating blade (86) is arranged oppositely to the nonmagnetic member (83a) with an appointed gap (Db) from the nonmagnetic member (83a) above the developing roller (83).

In addition, a guide member (87) formed of a plate slightly inclined in a chevron-like shape is provided in the vicinity of the regulating blade (86) and at an upper position of the bucket roller (84) within a space above the developing roller (83). One end of the guide member (87) is opposite to a nearly vertical portion of the regulating blade while the other end of the guide member (87) is positioned above the bucket roller. This position of the other end of the guide member (87) is not specially limited, so far as the replenishing toners can be suitably mixed with the developers within the developing apparatus.

With the above described constitution, the toner hopper (85) is supplied with the replenishing toners and the developing apparatus is supplied with the developer which is a mixture comprising toners and carriers in an appointed ratio. Upon switching on a print switch (not shown) under such a condition, the developer-retaining member (83a) and the bucket roller (84) are rotated in a direction shown by the arrow (b) and the arrow (c), respectively. When the developing apparatus (82) is operated in the above described manner, the developers are drawn in the buckets by a rotation of the bucket roller (84) to be conveyed in a direction shown by the arrow (c) together with the toners supplied from the replenishing roller (85b). The toners are electrostatically stuck to the carriers to be transferred on the developer-retaining member (83a) together with the carriers adsorbed by a magnetic attraction.

In this time, the developers, which have not been transferred on the developer-retaining member (83a), are returned to the bucket roller and transported to the developing roller again.

The developers adsorbed on the developer-retaining member (83a) are regulated in thickness by means of the regulating blade (86) with a rotation of the developer-retaining member (83a). That is, they are separated by means of the regulating blade (86) and a part of them is adsorbed on the developer-retaining member (83a) to an appointed thickness to be sent to the photosensitive member (81). The rest of the developers separated by means of the regulating blade (81) is pushed up along the vertical surface portion of the regulating blade (86) and further moved on the guide member (87) in a direction shown by an arrow and at last dropped on the bucket roller. Thus, the developers are returned again in the buckets or dropped into the developers to be mixed and then conveyed by a rotation of the bucket roller (84).

Figure 13:
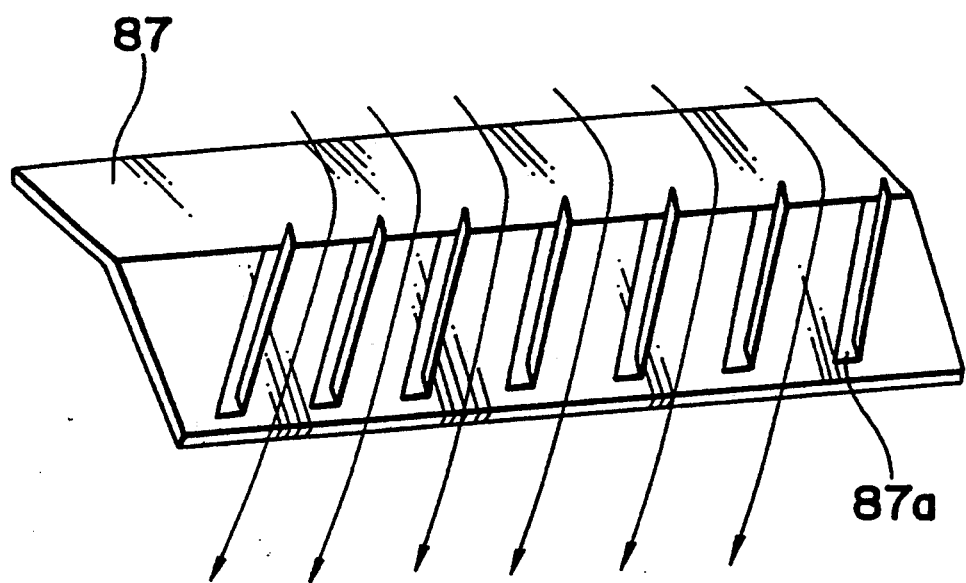

In more detail explanation of the guide member (87), the plate in the form slightly inclined in a chevron-like shape can be sufficiently used but a constitution as shown in FIG. 13 is still more effectual.

Referring to FIG. 13, the guide member (87) is provided with a large number of fins (87a) on an upper surface thereof. The respective fins (87a) are inclined in a back and forth direction passing through a paper in FIG. 12 on the guide member (87). Accordingly, the developers on the guide member (87) are moved along an inclination of the fins (87a). In an example shown in FIG. 12, to which the guide member shown in FIG. 13 is applied, the developers are conveyed from this side to the other side passing through paper to be dropped.

Furthermore, a distribution of quantity of developers in an axial direction of the developing apparatus can be uniformed by giving a function of conveying the developers from the other side to this side passing through paper to the bucket roller (84).

The developers on the developer-retaining member (83a) are brought into contact with the photosensitive member (81) in a developing zone to develop the electrostatic latent image on the photosensitive member (81) and further moved in a direction shown by the arrow (b) with a rotation of the developer-retaining member (83a). Subsequently, upon arriving where N poles of the magnet member (83b) are arranged adjacently to each other, the developers are subjected to a magnetic repelling power to be separated from the surface of the developer-retaining member (83a) and then thrust toward the bucket roller (84) along a bottom portion of the casing (88) with the rotation of the developer-retaining member (83a) followed by being drawn in the buckets again.

In the above described conveying process of the developers, the toners are appropriately charged by the frictional charging of the toners with the carriers until arriving at the developing zone under the condition that the developers do not stay in the vicinity of the regulating blade but electrification-build-up properties of toners can be improved and the toners can be sufficiently, uniformly and appropriately charged even within the limited time and distance to prevent the scattering of toners, the fogging by toners and the like by using the above described resin-coated carriers with a large number of fine pores on a surface thereof as a carrier.

Specific examples are shown below.

| Production Example of (−) toner | |
|---|---|
| ingredients | parts by weight |
| Polyester resin (softening point; 130° C., glass transition point; 60° C., AV: 25, OHV: 38) | 100 |
| Carbon black (MA#8; made by Mitsubishi Kasei K.K.) | 5 |
| Dye (Spilon Black TRH; made by Hodogadani Kagaku Kogyo K.K.) | 3 |

The above ingredients were sufficiently mixed in a ball mill and kneaded over a three-roller heated to 140° C. The kneaded mixture was left to stand for cooling at, and pulverized "coarsely in a feather mill and further pulverized into fine particles under jet stream, followed by being air-classified to obtain fine particles having mean volume particle size of 8.1 μm. Hydrophobic silica (R974; made by Nippon Aerosil K.K.) was mixed with the fine particles in a Henschel Mixer so that the silica might occupy 0.3 percents by weight. Thus, a toner was obtained.

| Production Example of (+) toner | |
|---|---|
| ingredients | parts by weight |
| Styrene-n-butyl methacrylate resin (softening point; 132° C., glass transition point; 60° C.) | 100 |
| Carbon black (MA#8; made by Mitsubishi Kasei K.K.) | 5 |
| Dye (Bontron P-51; made by Oriento Kagaku Kogyo K.K.) | 3 |

The above ingredients were sufficiently mixed in a ball mill and kneaded over a three-roller heated to 140° C. The kneaded mixture was left to stand for cooling at, and pulverized "coarsely in a feature mill and further pulverized into fine particles under jet stream, followed by being air-classified to obtain fine particles having mean volume particle size of 7.8 μm. Hydrophobic silica (R974; made by Nippon Aerosil K.K.) was mixed with the fine particles in a Henschel Mixer so that the silica might occupy 0.3 percents by weight. Thus, a toner was obtained.

PRODUCTION EXAMPLE 1 of Carrier (1) Preparation of Titanium-containing Catalyst Ingredient N-heptane, which had been dehydrated at room temperature, of 200 ml and magnesium stearate, which had been dehydrated at 120° C. under vacuum (2 mmHg), of 15 g (25 mmol) were put in a flask having the capacity of 500 ml replaced with argon to be turned into a slurry. Titanium tetrachloride of 0.44 g (2.3 mmol) was added drop by drop to the resulting slurry with stirring and then the resulting mixture was heated and subjected to a reaction for one hour with refluxing. A viscous and transparent solution of a titanium-containing catalyst ingredient was obtained.

(2) Evaluation of the Activity of the titanium-containing Catalyst Ingredient

Dehydrated hexane of 400 ml, triethyl aluminum of 0.8 mmol, diethyl aluminum chloride of 0.8 mmol and the titanium-containing catalyst ingredient, which was obtained in the above described (1), of 0.004 mmol as titanium atoms were put in an autoclave having the capacity of 1 l replaced with argon and heated to 90° C. In this time, a pressure within a system amounted to 1.5 kg/cm$^2$G. Then, hydrogen was supplied to increase the pressure to 5.5 kg/cm$^2$G and ethylene was continuously supplied so that the total pressure might be kept at 9.5 kg/cm$^2$G. The polymerization was carried out for one hour to obtain a polymer of 70 g. The polymerization activity was 365 kg/g.Ti/Hr and the MFR (the molten fluidity at 190° C. under load of 2.16 kg; JIS K 7210) of the obtained polymer was 40.

(3) Reaction of Titanium-containing Catalyst Ingredient with Fillers and Polymerization of Ethylene Hexane, which had been dehydrated at room temperature, of 500 ml and sintered ferrite powders F-200 (having a mean particle diameter of 70 μm manufactured by Powder Tech K.K.), which had been dried for 3 hours at 200° C. under vacuum (2 mmHg), of 450 g were put in an autoclave having the capacity of 1 l replaced with argon and the stirring was started. Then, the temperature was increased to 40° C. and 0.02 mmol as titanium atoms of the titanium-containing polymerization catalyst ingredient obtained according to (1) above mentioned was added and the resulting mixture was subjected to a reaction about 1 hour. Subsequently, triethyl aluminum of 2.0 mmol and diethyl aluminum chloride of 2.0 mmol were added and the resulting mixture was heated to 90° C. In this time, a pressure within a system amounted to 1.5 kg/cm$^2$G. Then, hydrogen was supplied to increase the pressure until 2 kg/cm$^2$G followed by conducting the polymerization for 40 minutes with continuously supplying ethylene so that the total pressure might be kept at 6 kg/cm$^2$G to obtain a ferrite-containing polyethylene composition of 473 g in all. The composition was dried for 1 hour at the room temperature under vacuum (2 mmHg) to obtain dried powders. The dried powders exhibited a uniform grayish white color and it was found by the electron microscopic observation that a surface of ferrite was thinly coated with polyethylene and no aggregation of ferrite particles among themselves was observed.

In this step, the obtained composition was measured by means of TGA (thermal balance) with the result that ferrite was contained in a quantity of 95.2 percents by weight.

Then, the composition was put in a hot gas current adjusted at 120° C. to be subjected to heat treatment for 2.0 hours. The obtained composition was classified by means of a sieve having 106 μm sieve openings to remove particles of 106 μm or more.

PRODUCTION EXAMPLE 2 of Carrier

Ferrite of 450 g and the titanium-containing catalyst ingredient, which had been prepared in a manner similar to (1) of PRODUCTION EXAMPLE 1, of 0.02 mmol as titanium atoms were put in an autoclave having the capacity of 1 l replaced with argon and the resulting mixture was subjected to a reaction for one hour in the same manner as (3) of PRODUCTION EXAMPLE 1. Subsequently, carbon black (Ketchen black DJ-600; manufactured by Lion Akuzo K.K.) of 0.47 g was added to the reaction mixture through an upper nozzle of the autoclave. Carbon black, which had been dried for one hour at 200° C. under vacuum and turned into a slurry by the use of dehydrated hexane, was used. Subsequently, triethyl aluminum of 2.0 mmol and diethyl aluminum chloride of 2.0 mmol were added to the reaction mixture and the resulting mixture was heated to 90°

C. In this time, a pressure within a system amounted to 1.5 kg/cm$^2$G. Then hydrogen was supplied to increase the pressure until 2 kg/cm$^2$G followed by conducting the polymerization for 45 minutes with continuously supplying ethylene so that the total pressure might be kept at 6 kg/cm$^2$G to obtain a ferrite and carbon black-containing polyethylene composition of 469.3 g in all. The composition was dried for 1 hour at the room temperature under vacuum (2 mmHg) to obtain dried powders. The dried powders exhibited a uniform black color and it was observed by an electron microscope that a surface of ferrite was thinly coated with polyethylene and carbon black was uniformly dispersed in polyethylene. In addition, this composition was analyzed by TGA (thermal balance) with the results that ferrite was contained in a quantity of 95.9 percents by weight and a ratio by weight of ferrite, polyethylene and carbon black was 24:1:0.025 as calculated from charged quantities.

Then, the composition was put in a hot gas current adjusted at 120° C. to be subjected to heat treatment for 2.0 hours. The obtained composition was classified by means of a sieve having 106 μm or more to remove aggregated particles.

PRODUCTION EXAMPLE 3 OF CARRIER

Ferrite of 450 g and the titanium-containing catalyst ingredient, which had been prepared according to (1) of PRODUCTION EXAMPLE 1, of 0.01 mmol as titanium atoms were put in an autoclave having the capacity of 1 l replaced with argon and the resulting mixture was subjected to a reaction for 1 hour in the same manner as in PRODUCTION EXAMPLE 1. Then, carbon black (Ketchen black EC manufactured by Lion Akuzo K.K.) of 0.50 g was put in the autoclave through an upper nozzle of the autoclave. In addition, carbon black, which had been dried for 1 hour at 200° C under vacuum and turned into a slurry by the use of dehydrated hexane, was used. Subsequently, triethyl aluminum of 1.0 mmol and diethyl aluminum chloride of 1.0 mmol were added to the resulting slurry and the resulting mixture was heated to 90° C. In this time, a pressure within a system amounted to 1.5 kg/cm$^2$G. Then, 1-butene of 37.5 mmol (2.1 g) was introduced and hydrogen was supplied to increase the pressure until 2 kg/cm$^2$G followed by conducting the polymerization for 28 minutes with continuously supplying ethylene so that the total pressure might be kept at 6 kg/cm$^2$G to obtain a ferrite and carbon black-containing polyethylenic composition of 467 g in all. The composition was dried for 1 hour at the room temperature under vacuum (2 mmHg) to obtain dried powders. The dried powders exhibited a uniform black color and it was observed by means of an electron microscope that a surface of ferrite was thinly coated with the polymer and carbon black was uniformly dispersed in the polymer. In addition, this composition was measured by means of TGA (thermal balance) with the result that a ratio by weight of ferrite, polymer and carbon black was 27:1:0.03. Furthermore, the polymer, from which ferrite and carbon black had been removed, was obtained by the Soxhlet extraction (solvent:xylene) and subjected to the infrared absorption analysis with the confirmation that the obtained composition was a polyethylenic copolymer containing butene in a quantity of 8 percents by weight.

Then, the composition was put in a hot gas current adjusted at 120° C. to be subjected to heat treatment for 2.5 hours. The obtained composition was classified by means of a sieve having 106 μm sieve openings to remove the particles of 106 μm or more.

PRODUCTION EXAMPLE 4 OF CARRIER

Ferrite fine particles (having a volume mean particle size of 0.2 μm) of 200 parts by weight, polyester resin of bisphenol type (softening point: 123° C., glass transition point: 65° C., AV: 21, OHV: 43, Mn: 7600, Mw: 188400) of 30 parts by weight were mixed well in a Henschel mixer (10 l capacity) and kneaded well by a two-axial extrusion kneader. The obtained mixture was cooled, pulverized roughly and further pulverized into fine particles by a hammer mill, followed by being air-classified to remove rough particles and fine particles. Thus, child-particles having a volume mean particle size of 3.5 μm for forming coating layers were obtained.

Carrier core material (sintered ferrite particles F-200; made by Powder Tech K.K., volume mean particle size: 70 μm) of 100 parts by weight, the above child-particles of 20 parts by weight were mixed at 2000 rpm for 2 minutes in a Henschel mixer (10 l capacity) to adhere the child-particles to the carrier core particles uniformly. The obtained carrier core particles with the child-particles adhered to the surface thereof were provided into a hot gas current heated at 320° C. to be subjected to heat treatment for about 1-3 seconds for the formation of coating layers. A positive charge-controlling agent (Nigrosine Base EX: made by Oriento Kagaku Kogyo K.K.) of 2 parts by weight on the basis of 100 parts by weight of the resin-coated carrier particles were fixed on the coating layers in a similar manner. The obtained carrier particles were dipped in a 6N HCl aqueous solution for 2 hours, washed well with water and dried 60° C. for 5 hours in a vacuum. Thus, resin-coated carrier particles having pores on the surface thereof were obtained. The filling ratio of carrier core materials was 95.4 percents by weight.

PRODUCTION EXAMPLE 5 OF CARRIER

Ferrite fine particles having volume mean particle size of 0.2 μm (250 parts by weight) were added into a resin solution of thermosetting silicon resin (KR-255: made by Shinetsu Silicon K.K.) on the basis of 100 parts by weight of resin solids of the solution. The composition was stirred for uniform dispersion by ultrasonic means to prepare a coating solution. The coating solution was applied repeatedly to sintered ferrite powders (core materials) (F-200:70 μm in mean particle size; made by Powder Tech K.K.) by SPIRA COTA (made by Okada Seiko K.K.) so that the resin layers of 25 percents by weight to the core materials might be formed on the core materials. Then, the system temperature was increased to 150° C. to cure the thermosetting resin. Thus, carrier particles coated with the thermosetting silicon resin having the ferrite particles dispersed therein were obtained. The obtained carrier was dipped in a 6N HCl solution for 2 hours, washed well with water and then dried in a vacuum for 5 hours at 60° C. Thus, resin-coated carrier particles having pores on the surface thereof were obtained. The filling ratio of carrier core materials was 91.5 percents by weight.

PRODUCTION EXAMPLE 6 OF CARRIER

A resin solution containing acrylic resin (Acrydick A 405; made by Dainippon Ink K.K.) at the solid content of 2 percents was used as a coating solution.

The coating solution was applied repeatedly to sintered ferrite powders (core materials) (F-200:70 μm in mean particle size; made by Powder Tech K.K.) by SPIRA COTA (made by Okada Seiko K.K.) so that the resin layers of 1.0 percent by weight to the core materials might be formed on the core materials. Then, the system temperature was increased to 150° C. to cure the resin. Thus, carrier particles coated with the thermosetting acrylic resin were obtained. The filling ratio of carrier core materials was 99.0 percents by weight.

The carriers obtained in Production Examples 1-8 had total pore volume (ml/g) referred to as one gram of carrier, total pore volume (ml/ml) referred to as one milliliter of resin of coating layer, mean particle size ($\mu$m), filling ratio of core materials (percents by weight), true specific gravity (g/cm$^3$), bulk specific gravity (g/cm$^3$), electrical resistance ($\Omega$·cm) and specific surface area (m$^2$/g) as shown in Table 1.

TABLE I

| Carrier Production Example No. | filling ratio of core material [wt %] | true specific gravity [g/cm$^3$] | bulk specific gravity [g/cm$^3$] | electrical resistance [$\Omega$·cm] | specific surface area [m$^2$/g] | total pore volume [ml/g] | total pore volume [ml/ml] | mean pore size [$\mu$m] |
| --- | --- | --- | --- | --- | --- | --- | --- | --- |
| 1 | 95.2 | 4.29 | 2.29 | $8.3 \times 10^{11}$ | 0.727 | 0.043 | 0.878 | 0.301 |
| 2 | 95.9 | 4.48 | 2.24 | $8.0 \times 10^{8}$ | 0.509 | 0.042 | 1.025 | 0.281 |
| 3 | 96.4 | 4.49 | 2.26 | $4.8 \times 10^{8}$ | 0.341 | 0.038 | 1.061 | 0.248 |
| 4 | 95.4 | 5.02 | 2.42 | $3.7 \times 10^{10}$ | 0.307 | 0.022 | 0.801 | 0.305 |
| 5 | 91.5 | 4.85 | 2.14 | $9.4 \times 10^{9}$ | 0.316 | 0.031 | 0.534 | 0.300 |
| 6 | 99.0 | 5.12 | 2.62 | $2.2 \times 10^{9}$ | 0.050 | <0.0005 | — | — |
| 7 | 94.8 | 5.00 | 2.32 | $1.2 \times 10^{11}$ | 0.281 | 0.029 | 0.870 | 0.305 |
| 8 | 99.0 | 5.15 | 2.61 | $8.6 \times 10^{8}$ | 0.074 | <0.0005 | — | — |

PRODUCTION EXAMPLE 7 OF CARRIER

Ferrite fine particles (volume mean particle size of 0.2 $\mu$m) of 250 parts by weight and styrene-acrylic resin (SBM-73F; made by Sanyo Kasei K.K.) of 30 parts by weight were mixed well in a Henschel mixer (capacity of 10 liters). The obtained mixture was kneaded in a two axial extrusion kneader. The kneaded mixture was cooled, pulverized coarsely, and further pulverized into fine particles by means of a hammer mill. Then, the obtained fine particles were air-classified to remove coarse and very fine particles. Thus, child-particles having volume mean particle size of 2.0 $\mu$m, which were used for coating core materials, were obtained.

Carrier core material (sintered ferrite particles F-200; made by Powder Tech K.K., volume mean particle size: 70 $\mu$m) of 100 parts by weight, the above child-particles of 30 parts by weight were mixed at 2000 rpm for 2 minutes in a Henschel mixer (10 l capacity) to adhere the child-particles to the carrier core particles uniformly. The obtained carrier core particles with the child-particles adhered to the surface thereof were provided into a hot gas current heated at 320° C. to be subjected to heat treatment for about 1-3 seconds for the formation of coating layers. A negative charge-controlling agent (Bontron S-34; made by Oriento Kagaku Kogyo K.K.) of 2 parts by weight on the basis of 100 parts by weight of the resin-coated carrier particles were fixed on the coating layers in a similar manner. The obtained carrier particles were dipped in a 6N HCl aqueous solution for 2 hours, washed well with water and dried 60° C. for 5 hours in a vacuum. Thus, resin-coated carrier particles having pores on the surface thereof were obtained.

PRODUCTION EXAMPLE 8 OF CARRIER

A carrier was prepared in a manner similar to Production Example 6 of carrier except that the ferrite fine particles were not added and that the acid treatment was not carried out.

The total pore volume and the mean pore size were calculated from distribution of carrier pores. The distribution of carrier pores was measured by mercury porosimetry, using Pore Sizer 9310 (made by Shimazu Seisakusho K.K.) under conditions of 130° in mercury contact angle and 484 dyn/cm in surface tension. The results were shown in FIG. 14–FIG. 21.

Figure 14:
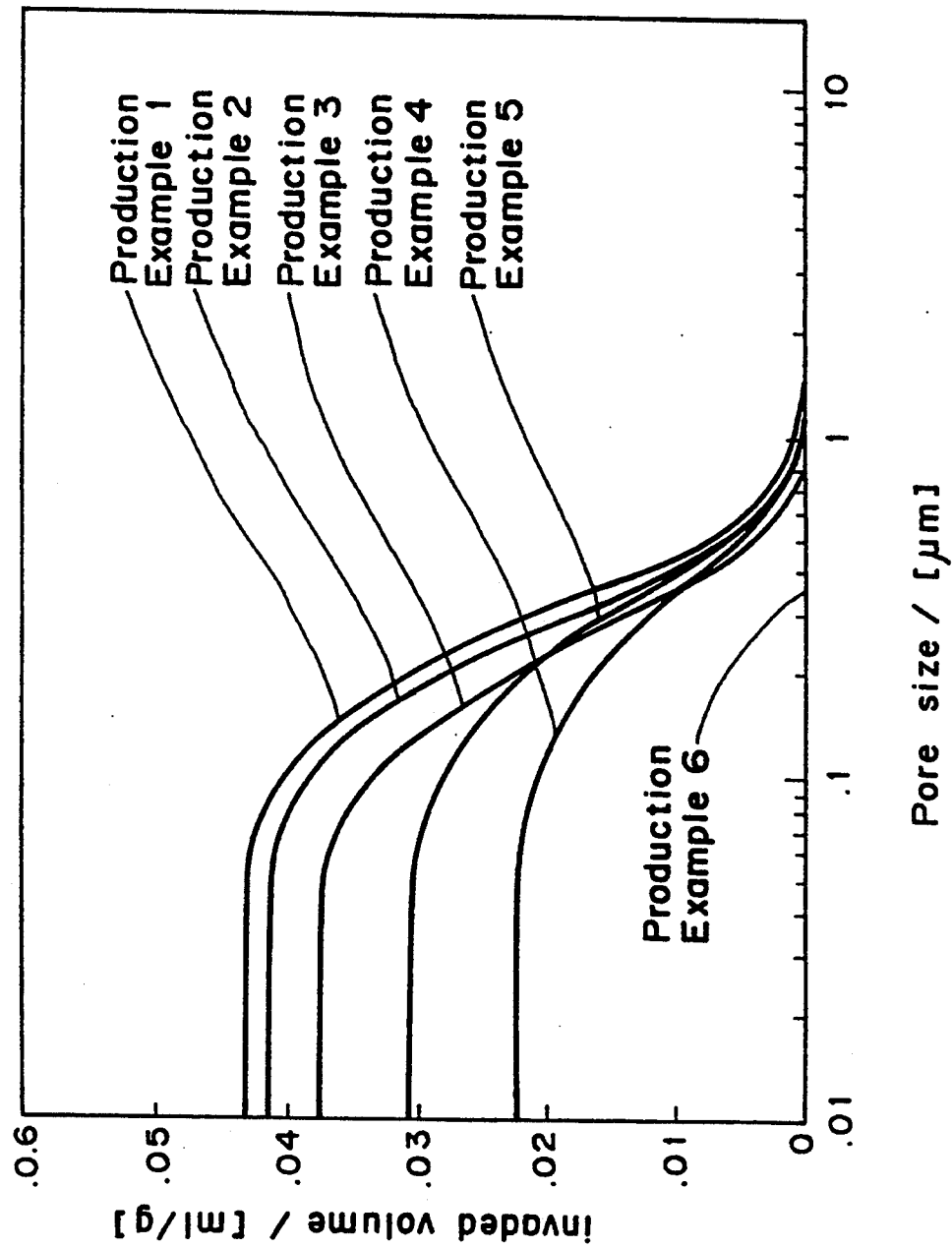
FIG. 14 and FIG. 15 show respectively a relationship between pore size and invaded volume.
Figure 15:
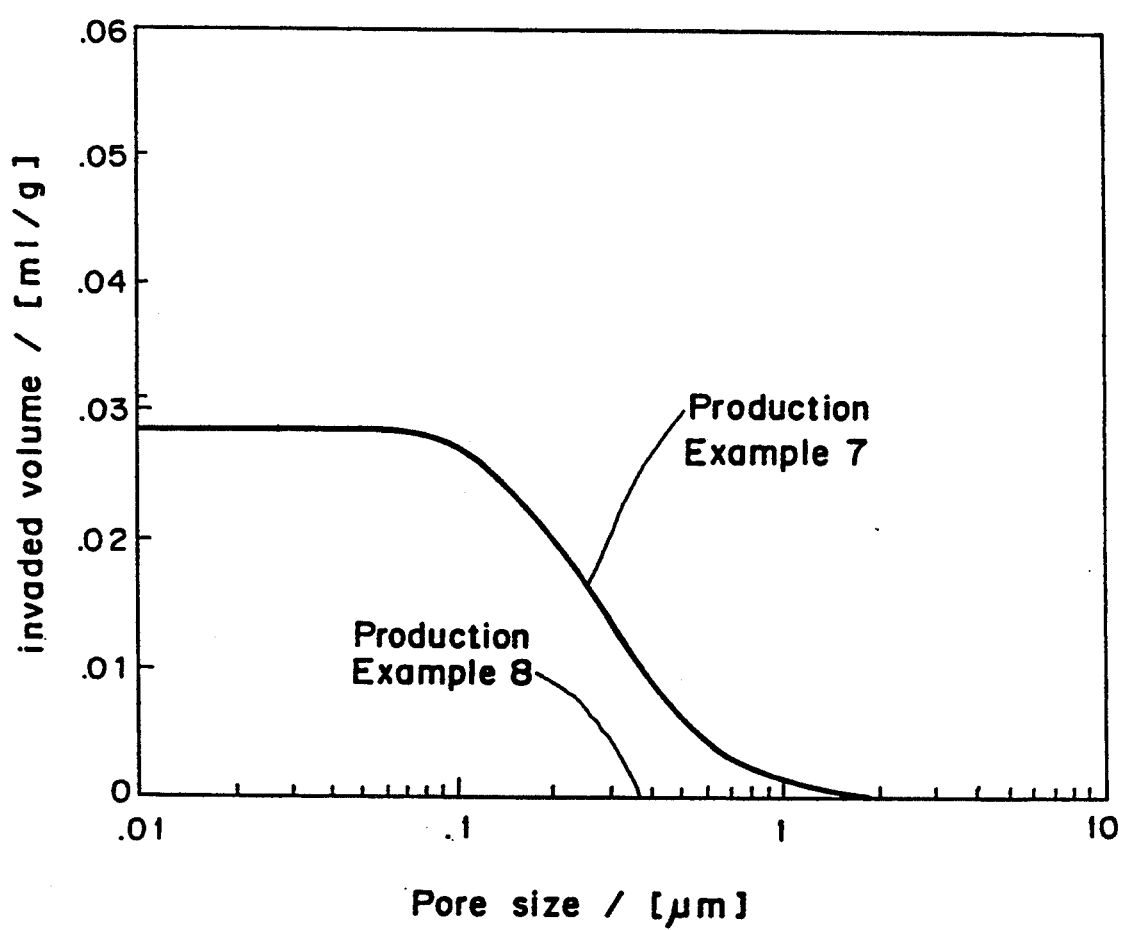
Figure 16:
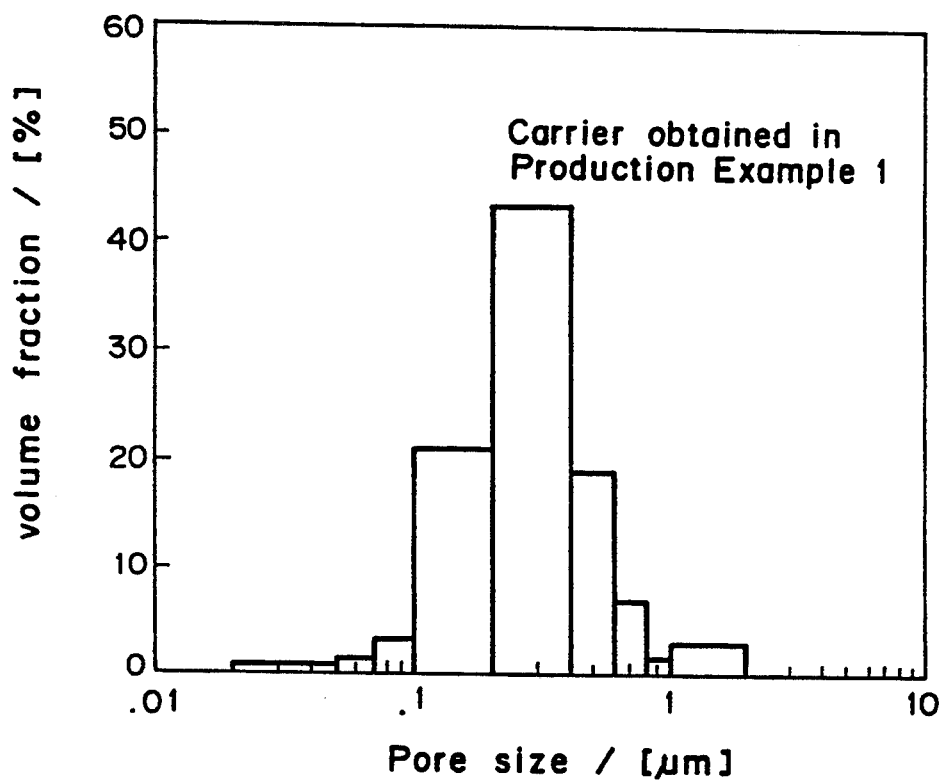
FIG. 16-FIG. 21 show respectively a relationship between pore size and volume fraction.
Figure 17:
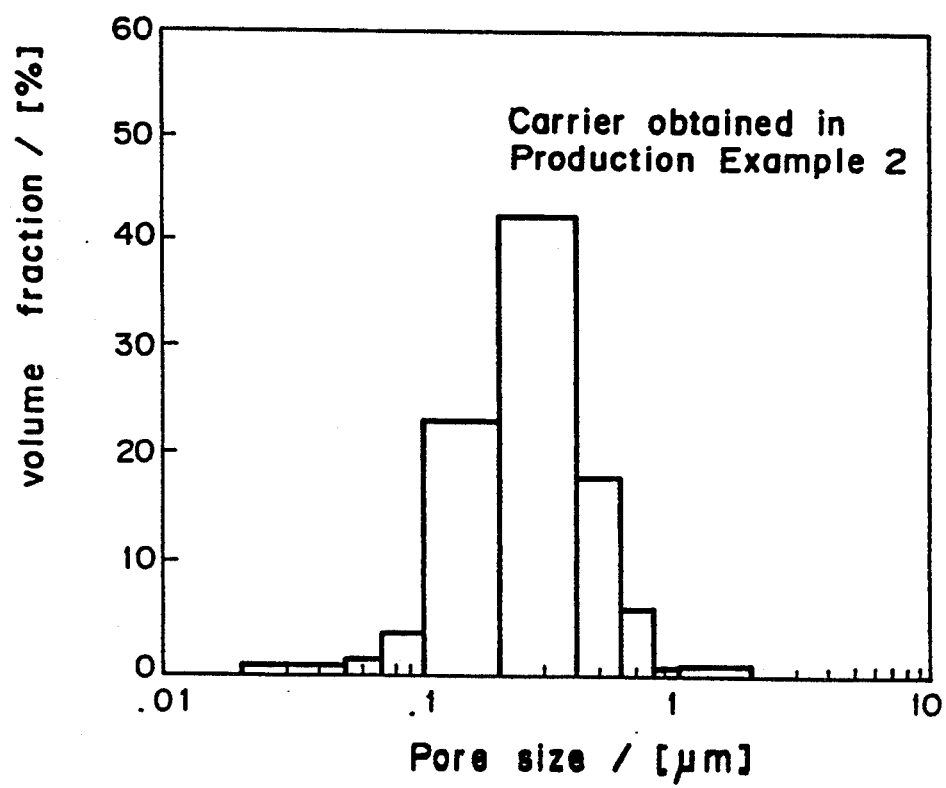
Figure 18:
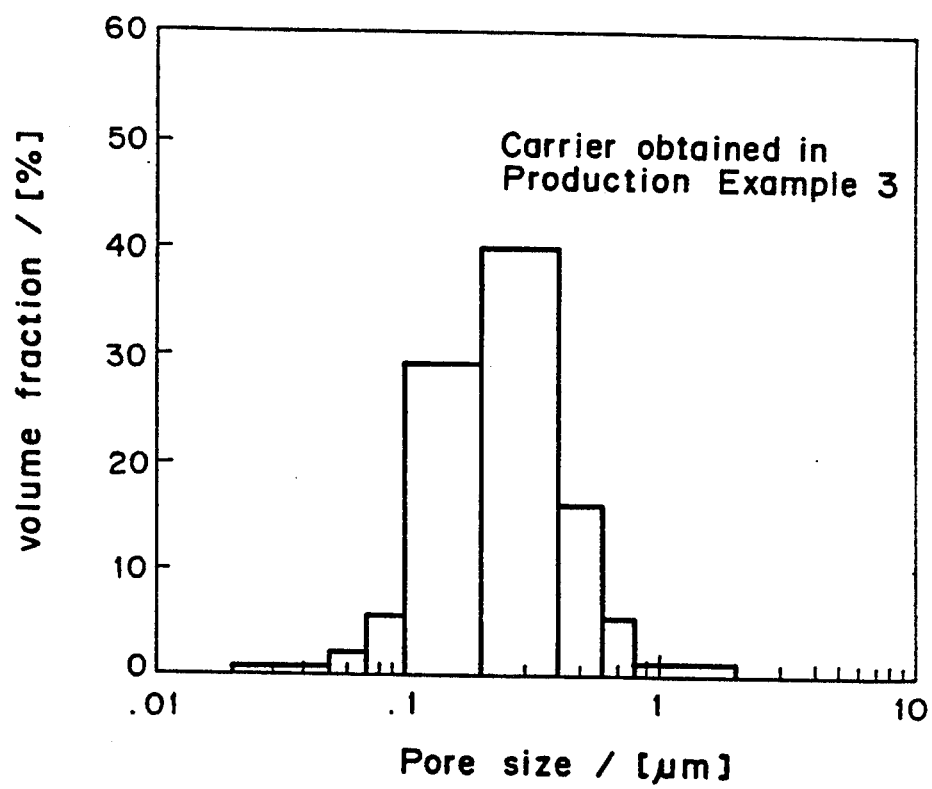
Figure 19:
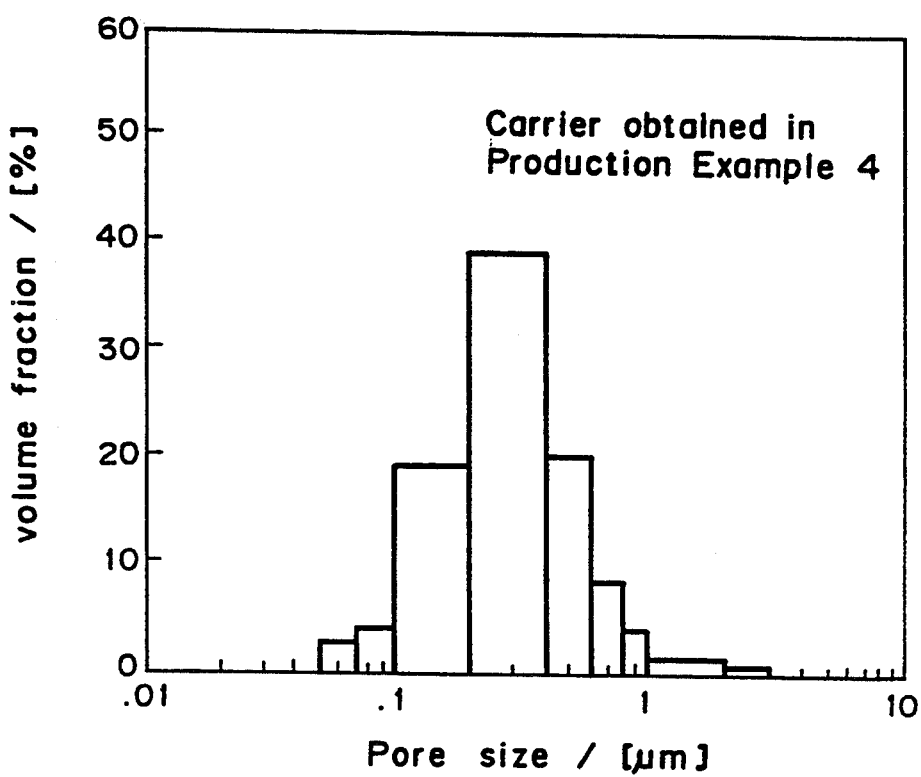
Figure 20:
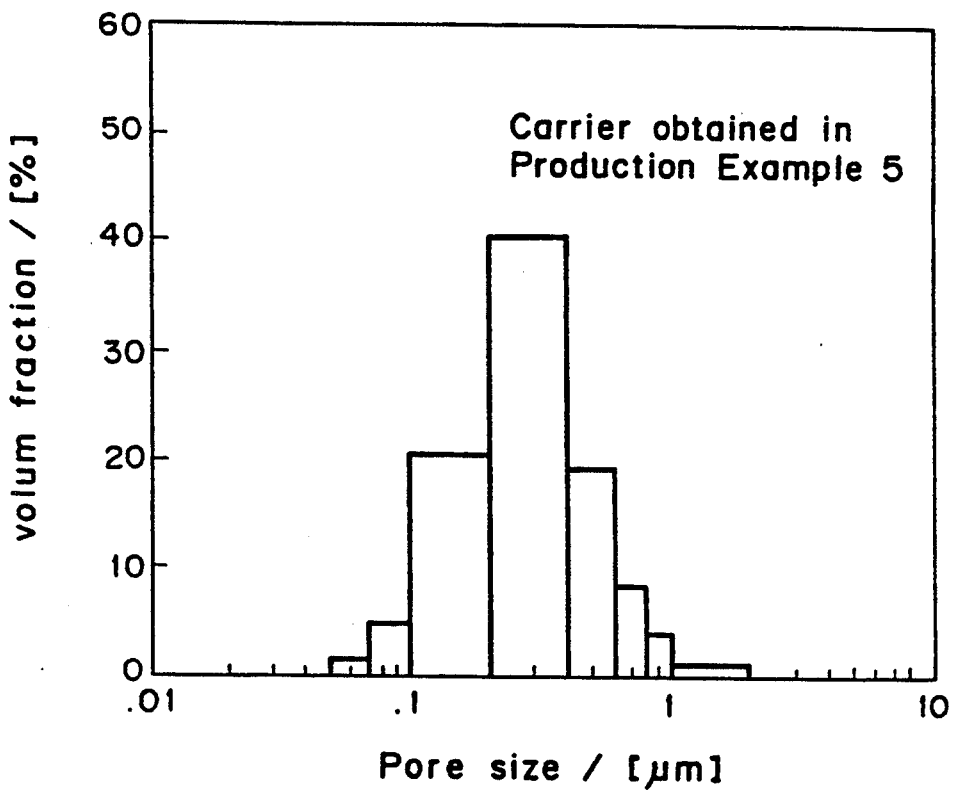
Figure 21:
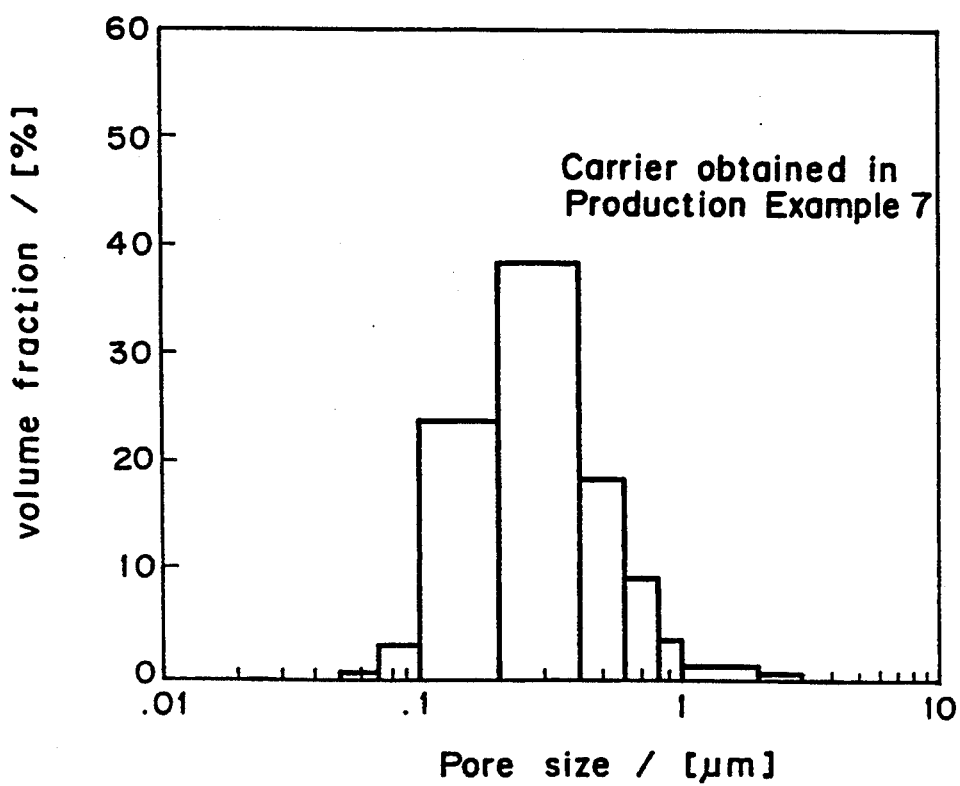

FIG. 14 and 15 show the relationship between pore size and invaded volume. The invaded volume means the volume of mercury pressed into pores up to maximal pressure.

FIG. 16–FIG. 21 show the relationship between pore size and volume fraction. The volume fraction means the ratio (percents) of the total volume of pores within the range of specified pore size to the total volume of all pores.

The specific gravity was measured in the following procedures by the use of a measuring apparatus provided with an electronic balance:

the sensitivity is 0.1 mg;

a pycnometer:

a specific-gravity bottle having an inside capacity of 50 ml provided with a Gay-Lussac thermometer provided in JIS R 3501 (glass wares for use in the analytical chemistry); and a constant temperature bath:

a water temperature can be kept at 23°±0.5° C.

1) A weight of a pycnometer, which has been previously dried, is accurately measured until a figure of 0.1 mg.

2) The pycnometer is filled with n-heptane, which has been sufficiently degassed, and held in the constant temperature bath of 23°±0.5° C. followed by accurately setting a surface of a liquid to a gauge line. The pycnometer is taken out of the constant temperature bath and water stuck to an outside of the pycnometer is completely wiped off followed by accurately measuring a weight of the pycnometer with n-heptane therein until a figure of 0.1 mg.

3) Subsequently, the pycnometer is emptied and then filled with a sample of 10 to 15 g followed by accurately measuring a weight of the pycnometer with the sample therein again to subtract the result in 1) from the obtained result, whereby determining the weight of the sample.

4) Degassed n-heptane of 20 to 30 ml is gently put in the pycnometer with the sample therein to completely cover the sample with n-heptane followed by gently removing air from the liquid in a vacuum desiccator.

5) Then, the pycnometer is filled with degassed n-heptane until the vicinity of the gauge line and held in the constant temperature bath of 23°±0.5° C. for 1 hour. After the surface of the liquid was accurately set to the gauge line, the pycnometer is taken out of the constant temperature bath and water stuck to the outside of the pycnometer is completely wiped off followed by accurately measuring a weight of the pycnometer with the sample and n-heptane therein until a figure of 0.1 mg.

6) The specific gravity is calculated by the following equation:

$$S = a \cdot d / (b - c + a)$$

wherein S: specific gravity;
  a: weight of the sample (g);
  b: weight (g) of the pycnometer with an immersion liquid filled until the gauge line thereof;
  c: weight (g) of the pycnometer containing the sample with the immersion liquid filled until the gauge line thereof; and
  d: specific gravity of the immersion liquid at 23° C.

Bulk specific gravity was measured according to JIS Z 2504.

The electric resistance was calculated in inherent bulk resistance $\rho$ by placing the sample having a thickness of 1 mm and a diameter of 50 mm on a metallic circular electrode, placing an electrode having a weight of 895.4 g and a diameter of 20 mm and a gird electrode having an inside diameter of 38 mm and an outside diameter of 42 mm on the sample, and reading a value of an electric current after 1 minute from a point of time when the application of a direct current voltage of 500 V was started. The measurements were repeated 5 times under the environment that a temperature was 25°±1° C. and a relative humidity was 55±5 percents and their mean value was adopted.

The specific surface area was measured by means of BET method on the basis of nitrogen gas absorption, using Flow Sorb 2300 (made by Shimazu Seisakusho K.K.).

Evaluation of electrification-build-up properties of toners

After the carriers were mixed with the toners for a specified time, a quantity of charges (q) was measured by the method described in the Bulletin of the Society of Electrophotography., Vol. 27, No. 3 (1988) "the Determination of the Charging Speed of Developers" using the developers containing toners in a quantity of 2 percents by weight prepared from the carriers obtained according to PRODUCTION EXAMPLE 2 and PRODUCTION EXAMPLE 6 (=COMPARATIVE EXAMPLE) and the (−) toners obtained in the above described PRODUCTION EXAMPLE.

Figure 22:
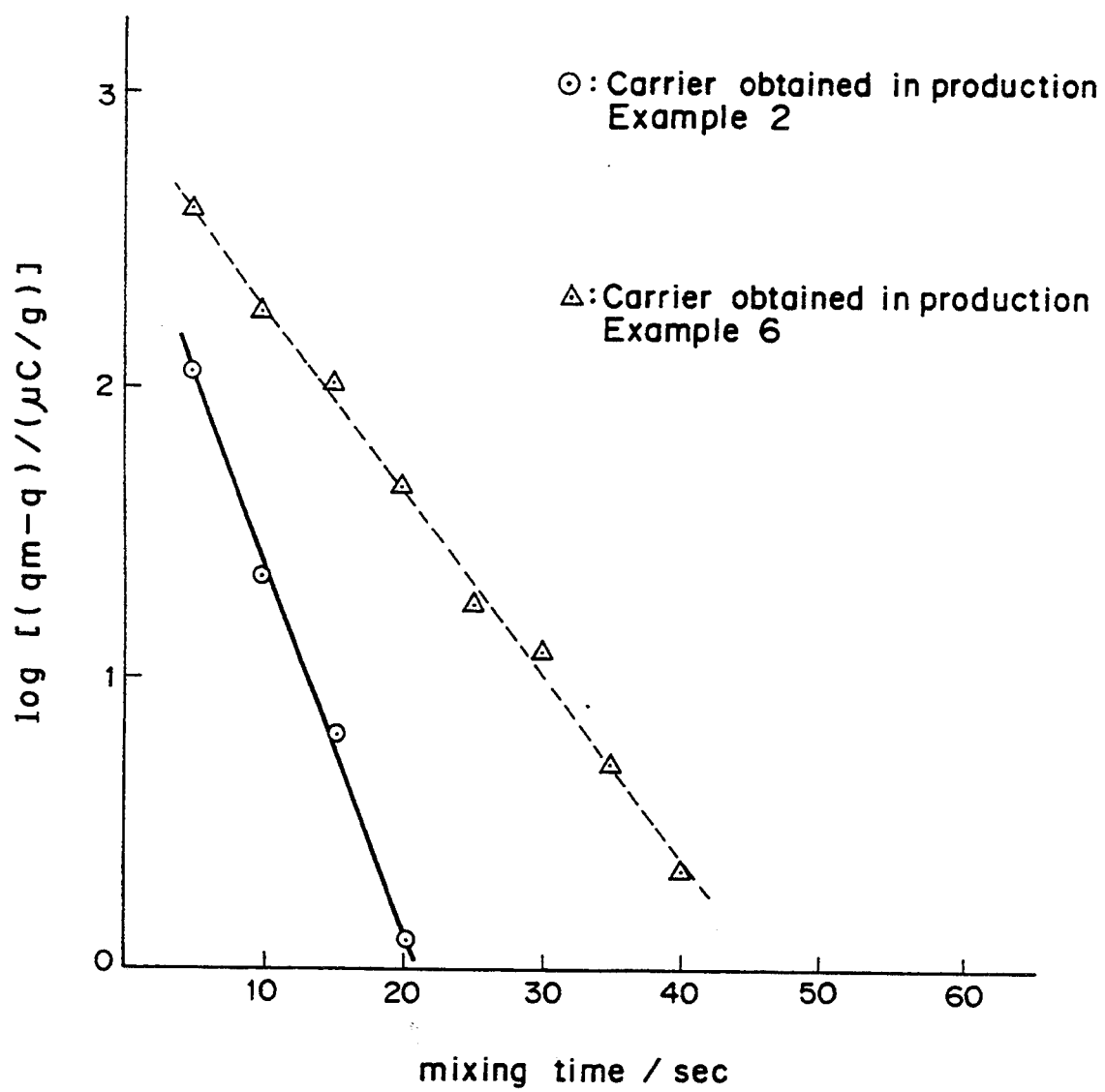
FIG. 22 and FIG. 23 show respectively a relationship between $\log(q_m - q)$ and t.

A relation between log (qm−q) and t is shown in FIG. 22 on the basis of the obtained data. Here, qm designates a saturated (or maximum) quantity of charges.

Said relation between log (qm−q) and the time t is linear and an electrification-build-up speed can be expressed by its slope. The steeper the slope is, the faster the electrification-build-up speed is.

It can be found that the carriers obtained in PRODUCTION EXAMPLE 2 are superior to the carriers obtained in PRODUCTION EXAMPLE 6 (=COMPARATIVE EXAMPLE) in electrification-build-up-properties.

Also the carriers obtained in PRODUCTION EXAMPLES 1, 3, 4, 5 were superior in electrification-build-up-properties in the same manner as those obtained in PRODUCTION EXAMPLE 2.

Figure 23:
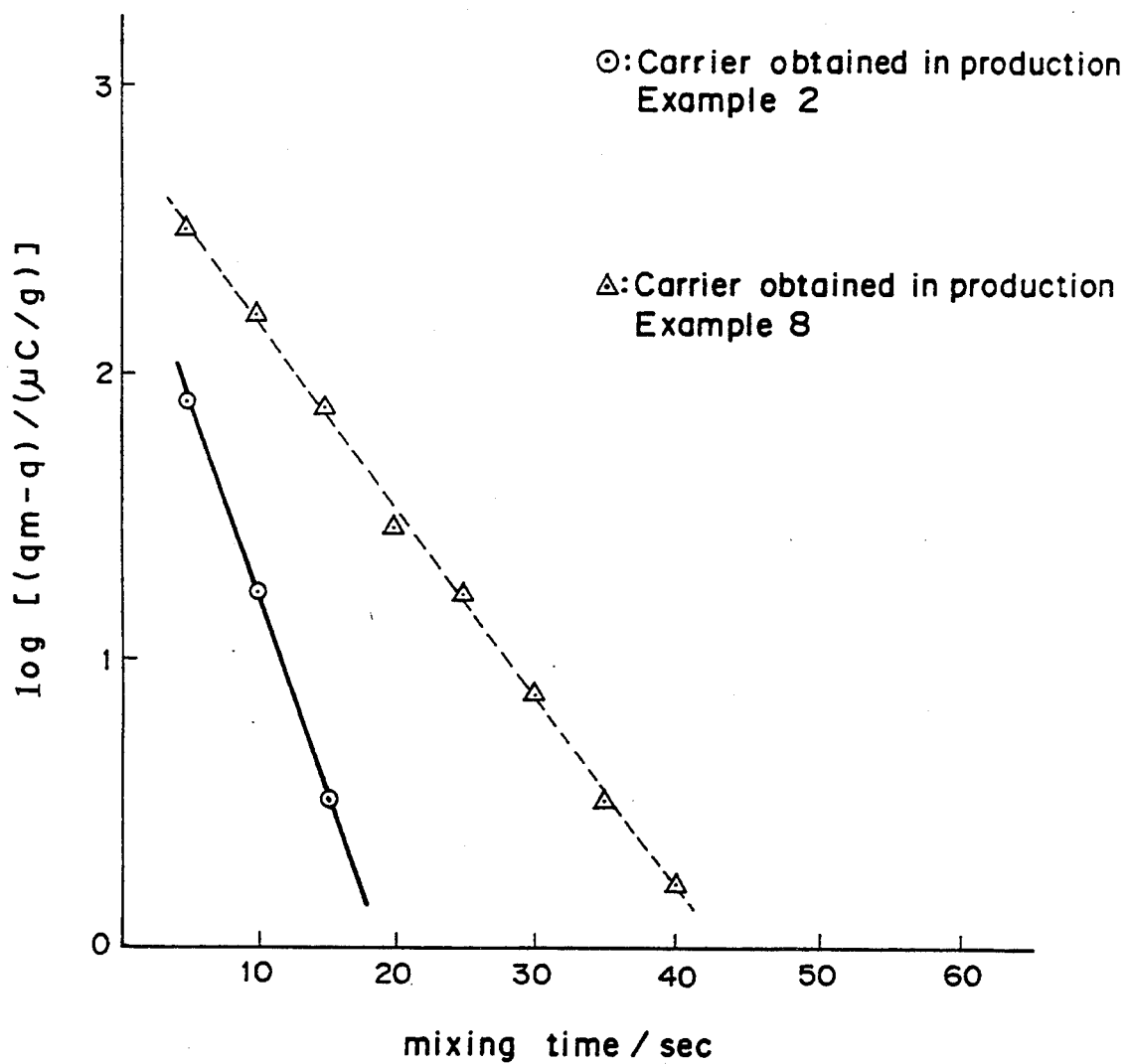

In addition, the quantity of charges (q) was measured in the same manner as above described excepting that the developers containing toners in a quantity of 2 percents by weight prepared from the carriers obtained in PRODUCTION EXAMPLE 2 and PRODUCTION EXAMPLE 8 (=COMPARATIVE EXAMPLE) and the (+) toners obtained in the above described PRODUCTION EXAMPLE were used and a relation between log (qm−q) and t is shown in FIG. 23.

Evaluation 1 by means of Developing Apparatus (Evaluating Machine)

The developing apparatus having a constitution shown in FIG. 4 was used. The scattering of toners, the fogging by toners and the white spots in net images were evaluated under the following printing conditions using a laser printer (reverse development) having a recording density of 400 dpi. A negatively chargeable organic photosensitive member was installed in the laser printer.

| | |
|---|---|
| *Circumferential speed of the photosensitive member: | 110 mm/sec |
| *Electric potential of an surface of the photosensitive member: | |
| On the non-image portion | −600 V |
| On the image portion | −70 V |
| *Developing bias: | −500 V |
| *Circumferential speed of the developer-retaining member /circumferential speed of the photosensitive member: | 1.4 |
| *Developing gap (gap between the photosensitive member and the developer-retaining member): | 0.6 mm |
| *Regulating gap (gap between the developer-retaining member and the layer thickness-regulating blade): | 0.5 mm |
| *Carrier: the ones obtained in PRODUCTION EXAMPLE 2 and PRODUCTION EXAMPLE 6 (COMPARATIVE EXAMPLE) *Toner: the one obtained in the above described PRODUCTION EXAMPLE of (−) toner | |

(Evaluation method)

The developers containing toners in various quantities (4 to 12 percents by weight) were obtained in combination of the above described carriers and toners and then printed in the above described evaluating machine to evaluate a quality of copied images.

(Viewpoints in the Evaluation)

A net copied-images of 2×2 dots was formed all over the surface of a paper of A4 size to evaluate an appearance of white spots (voids) by the visual observation.

Images having various kinds of pattern were copied and the appearance of toner foggs on a white ground portion and the uniformity of the copied-images in concentration were evaluated by a visual observation and a reflecting concentration meter, respectively.

(Results of Evaluation)

In the case where the carriers obtained in PRODUCTION EXAMPLE 6 were used, a number of white spots in the net image were increased and the toner foggs grew worse with an increase of the mixing ratio of toners in the order of 4 percents by weight→6 percents by weight→8 percents by weight→10 percents by weight→12 percents by weight. In the case where the carriers obtained in PRODUCTION EXAMPLE 2 were used, the number of white spots in the net image and the toner foggs were unchanged even though the mixing ratio of toners was changed in the above described manner, and excellent copied-image having no problem was obtained.

In addition, the carriers of PRODUCTION EXAMPLE 2 were superior to the carriers of COMPARATIVE EXAMPLE also in irregularity of concentration. Furthermore, even though the copying test was carried out using the carriers of PRODUCTION EXAMPLE 2, the scattering of toners and the fogging by toners did not occur and thus the high quality of copied-images could be kept.

Evaluation 2 by means of Developing Apparatus (Evaluating Machine and Conditions)

The developing apparatus having a constitution shown in FIG. 5 was used. The copying test of 50000 times was carried out under the following conditions using the carriers of PRODUCTION EXAMPLE 2 and PRODUCTION EXAMPLE 8 (=COMPARATIVE EXAMPLE).

The toners of the above described PRODUCTION EXAMPLE of (+) toner were used to produce the developers. An initial mixing ratio of toners was 6 percents by weight. Said mixing ratio of toners in the developers was controlled so as to be kept at 6 percents by weight also in the copying test.

| (Conditions) | |
| --- | --- |
| Developing gap: | 0.6 mm |
| Regulating gap: | 0.4 mm |
| Circumferential speed of the photosensitive member: | 350 mm/sec |
| Circumferential speed of the developer-retaining member/ circumferential speed of the photosensitive member: | 2.0 |
| Angle between the magnetic pole N1 and the magnetic pole N2: | 30° |
| Intensity of the magnetic poles N1, N2 | 1000 Gauss |
| Developing bias: (In addition, an organic photosensitive member was used as a photosensitive member.) | −180 V |
| Copying mode | 0 to 10000 times MS B/W ratio 10 percents 10000 to 30000 times MS B/W ratio 15 percents 30000 to 50000 times MS B/W ratio 35 percents (MS; manuscript) |

In the case where the carriers of PRODUCTION EXAMPLE 2 were used, the scattering of toners hardly occurred and the excellent, initial quality of copied images could be kept. These excellent properties could be kept even after the copying process was repeated 50000 times.

On the contrary, in the case where the carriers of PRODUCTION EXAMPLE 8 (COMPARATIVE EXAMPLE) were used, the scattering of toners was increased with an increase of number of copying times and an increase of the B/W ratio in MS, and an inside of the copying machine was violently soiled and the fogging by toners occurred. A quality of copied images was remarkably deteriorated in the copying mode in which the B/W ratio of MS was 35 percents after the copying process was repeated 30000 times.

Evaluation 3 by means of Developing Apparatus (Evaluating Machine and Conditions)

The developing apparatus having a constitution shown in FIG. 9 was used. The copying test of 10000 times was carried out under the following conditions using the carriers of=the PRODUCTION EXAMPLE 2 and PRODUCTION EXAMPLE 8 (=COMPARATIVE EXAMPLE).

The toners of the above described PRODUCTION EXAMPLE of (+) toner were used to produce the developers. A mixing ratio of toners was 6 percents by weight. Said mixing ratio of toners in the developers was controlled so as to be kept at 6 percents by weight also in the copying test.

(Developing Conditions)

Photosensitive member
  Kind: Organic photosensitive member
  Surface electric potential ($V_0$): −800 V
  Circumferential speed: 35 cm/sec
Upper developer-retaining member (33)
  Developing bias voltage: −200 V
  Diameter of the developer-retaining member ($\phi$): 24.5 mm
  Developing gap ($Ds_1$) (gap between the upper developer-retaining member and the photosensitive member): 0.7 mm
  Circumferential speed of the member: 49 cm/sec
Lower developer-retaining member (34)
  Developing bias voltage: −200 V
  Diameter of the developer-retaining member ($\phi$): 24.5 mm
  Developing gap ($Ds_2$) (gap between the lower developer-retaining member and the photosensitive member): 0.7 mm
  Circumferential speed of the member: 49 cm/sec Gap ($Ds_3$) between the upper developer-retaining member and the lower developer-retaining member: 1.0 mm
Mode:
  0 to 5000 times MS B/W ratio 15 percents
  5000 to 10000 times MS B/W ratio 30 percents (Results)

In the case where the carriers to PRODUCTION EXAMPLE 2 were used, toner fogs were hardly formed on the copy ground and the initial excellent quality of copied-images could be kept even after a copying process was repeated 10000 times. In addition, the scattering of toners was not observed.

On the contrary, in the case where the carriers of PRODUCTION EXAMPLE 8 (COMPARATIVE EXAMPLE) were used, the fogging by toners became gradually remarkable with an increase of copying times. Simultaneously, the scattering of toners occurred within the copying machine. Although the developing apparatus having developer-retaining members was used in the present preferred embodiment, the present invention can be similarly applied to the developing apparatus having more developer-retaining members.

Evaluation 4 by means of Developing Apparatus (Evaluating Machine and Conditions)

The developing apparatus having a constitution shown in FIG. 10 was used. The copying test was carried out under the following conditions using the carriers obtained of PRODUCTION EXAMPLE 2 and PRODUCTION EXAMPLE 8 (=COMPARATIVE EXAMPLE) and the toners obtained of PRODUCTION EXAMPLE of (+) toner. A wholly black image having a solid area ratio (a ratio of a length of wholly black image to a whole length in a paper-sending direction) of 50 percents was continuously copied 1000 times to evaluate spilling conditions of toners and the fogging condition by toners at that time.

[Experimental Conditions]

a. Developer-retaining member (63)
   Diameter                                    24.5 mm
   Rotation speed                              200 rpm
   Developing bias voltage (Vb)                DC −200 V
b. Toner-supplying roller (48)
   Diameter                                    20 mm
   Rotation speed                              200 rpm
   Collecting bias voltage (Vss)               DC −400 V
                                               AC 700 V
   Alternating current frequency               300 Hz
   Surface roughness                           400 μm
   Surface area of fine concave                80 percents
   portions
c. Gap
   Developing gap (Ds)                         0.6 mm
   Regulating gap (Db)                         0.45 mm
   Supplying gap (Dss)                         0.8 mm
d. Metal blade (54)
   Thickness                                   t = 150 μm
   Pressurizing power                          0.1 g/mm
   A system.speed was set at 13 cm/sec.
   The results are shown in the following Table 2.

TABLE 2

|                    | PRODUCTION EXAMPLE 2 | COMPARATIVE EXAMPLE |
|--------------------|----------------------|---------------------|
| Fogging by toners  | o                    | x                   |
| Spilling of toners | o                    | x                   |

Mark o: this mark shows a level having no problem in practical use
Mark x: Fogging by toners: this mark shows that toner foggs are visually observed distinctly on the copy ground and the copied images are not so clear. Therefore, the practical use is hindered.

Spilling of toners: this mark shows that the spilling of toners in the opening portion of and around the developing apparatus is distinctly observed and thus the practical use is hindered.

Evaluation 5 by means of Developing Apparatus (Evaluating Machine)

The developing apparatus having a constitution shown in FIG. 11 was used. In this developing apparatus, an electrophotographic printer was used at a developing speed of 20 sheets of paper/min. An organic photosensitive member was installed in the printer having a digital image-forming system of 400 dpi. The scattering of toners, the fogging by toners and the uniformity of diameter of copied-dots of net image were evaluated by repeating a copying process 200000 times.

Thickness of the developer layer in the developing zone: 0.6 mm

Gap between the surface of developer-retaining member and the photosensitive member: 0.5 mm Electric potential on the surface of the photosensitive member: −700 V

| *Developing bias | |
|---|---|
| Alternating current voltage: frequency (f) | 2000 Hz |
| peak to peak voltage (Vp-p) | 1200 V |
| Direct current voltage: | −500 V |

Carrier: the one obtained in PRODUCTION EXAMPLE 2 and PRODUCTION EXAMPLE 6 (COMPARATIVE EXAMPLE)

Toner: the one of EXAMPLE of (−) toner

Mixing ratio of toners: 6 percents by weight (Method of Evaluating the Uniformity of Diameter of Copied Dots of Net Image)

The uniformity of diameter of copied dots of net image (120 mesh, area ratio of 30 percents) was evaluated in the following manner using an image analyzer (LUZEX 5000).

Areas of the respective dots are measured and then an each diameter of a circle corresponding to the measured area is calculated. A value obtained by dividing a standard deviation of the diameters by a mean value of them was adopted as a dot-diameter fluctuating coefficient and a value obtained by dividing the dot-diameter fluctuating coefficient by that of the original chart was adopted as an index showing the uniformity of diameter of dots.

The results are shown in the following Table 3.

TABLE 3

| (the uniformity of diameter of copied dots of net image) | | | |
|---|---|---|---|
|  | Initial stage | After 100000 times of copy | After 20000 times of copy |
| PRODUCTION EXAMPLE 2 | 5.9 | 6.2 | 6.0 |
| PRODUCTION EXAMPLE 6 (= COMPARATIVE EXAMPLE) | 6.5 | 8.9 | 11.2 |

The carriers according to PRODUCTION EXAMPLE 2: no charge occurred from the first stage and thus good results were obtained.

The carriers according to PRODUCTION EXAMPLE 6: the uniformity of diameter of copied dots was remarkably reduced after 200000 times of copy.

(Scattering of and Fogging by Toners)

In the case where the carriers of PRODUCTION EXAMPLE 2 were used, the scattering of and fogging by toners hardly occurred and the initial superior quality of image could be kept even after 200000 times of copy.

On the contrary, in the case where the carriers of PRODUCTION EXAMPLE 6 were used, the scattering of and the fogging by toners were gradually deteriorated with an increase of number of copying times. The scattering and the fogging became so remarkable after about 150000 times of copy that the carriers could not be practically used.

Evaluation 6 by means of Developing Apparatus

The developing apparatus, having a constitution shown in FIG. 12 was used. A copying process was repeated 100000 times under the following conditions to evaluate the scattering of toners, the fogging by toners and the reproducibility of fine lines having a resolution pattern of 7.1 line pair/cm using a copying machine (40 sheets/min) with a Se series photosensitive member installed therein.

Developer
Carriers: the ones of PRODUCTION EXAMPLE 2 and PRODUCTION EXAMPLE 6 (COMPARATIVE EXAMPLE)
Toners: the one of PRODUCTION EXAMPLE of (−) toner
Mixing ratio: 6 percents by weight
Photosensitive member
Circumferential speed of the photosensitive member: 24.8 cm/sec
Circumferential speed of the photosensitive member /circumferential speed of the developer-retaining member: 2.0
Electric potential charged on the photosensitive member: +600 V
Developing bias: +150 V
Developing gap Ds: 0.6 mm
Regulating gap Db: 0.45 mm (Results)

In the case where the carriers of PRODUCTION EXAMPLE 2 were used, the reproducibility of fine lines hardly changed after 100000 times of copy and 7.1 line pair could be satisfactorily reproduced.

On the contrary, in the case where the carriers according to COMPARATIVE EXAMPLE were used, the reproducibility of fine lines was deteriorated with an increase of copying times, in particular after 30000 times of copy.

Also the fogging by and the scattering of toners showed results corresponding to those of the reproducibility of fine lines.

What is claimed is:

1. A method of developing electrostatic latent images which comprises the steps of:
    supplying a developer onto a developing sleeve made of nonmagnetic material and arranged oppositely to an electrostatic latent image-retaining member with a minute gap therebetween, said developer including toners having a mean particle size within a range of 3 to 20 μm and resin-coated carriers which comprise core particles formed of magnetic materials and a resin-coating layer formed by polymerizing monomers on a surface of the core particles and having pores which have a pore size distribution within a range of 0.001 to 3 μm and a mean pore size within a range of 0.1 to 0.5 μm on the surface thereof;
    forming a magnetic brush of the developer by the magnetic force of a magnet member having plural poles in the circumferential direction thereof, said magnet member fixedly arranged within the developing sleeve;
    mixing the developer conveyed by a rotation of the developing sleeve forward to a regulating member oppositely arranged to the developing sleeve, wherein excess developer is scraped off by said regulating member;
    conveying the mixed and regulated developer by the rotation of the developing sleeve to a developing zone where the electrostatic latent image-retaining member is arranged oppositely to the developing sleeve; and
    developing electrostatic latent images using the developer.

2. A method of developing an electrostatic latent image as set forth in claim 1, wherein a development is carried out under the condition that the magnetic brush is brought into contact with the electrostatic latent image-retaining member in the developing zone.

3. A method of developing an electrostatic latent image as set forth in claim 1, wherein a development is carried out under the condition that the magnetic brush is not brought into contact with the electrostatic latent image-retaining member in the developing zone.

4. A method of developing an electrostatic latent image as set forth in claim 1, a total pore volume referring to as one gram of carriers is 0.001 to 0.1 ml/g.

5. A method of developing an electrostatic latent image as set forth in claim 1, wherein a total pore volume referring to as one milliliter of resin of coating layer is 0.1 to 2 ml/ml.

6. A method of developing an electrostatic latent image as set forth in claim 1, wherein a coating ratio of the carriers is 70 percents or more.

7. A method of developing an electrostatic latent image as set forth in claim 1, wherein a filling ratio of the carriers with carrier core particles is 90 percents by weight or more.

8. A method of developing an electrostatic latent image as set forth in claim 1, wherein a specific gravity of the carriers is 3.5 to 7.5.

9. A method of developing an electrostatic latent image as set forth in claim 1, wherein an electric resistance of the carriers is $1 \times 10^6$ to $1 \times 10^{14}$ Ω·cm.

10. A method of developing an electrostatic latent image as set forth in claim 1, wherein the resin-coating layer contains electrically conductive fine particles or fine particles having a charge controlling function.

11. A method of developing an electrostatic latent image as set forth in claim 1, wherein the electrically conductive fine particles or fine particles having a charge controlling function are added in a quantity of 0.1 to 60 percents by weight to the resin-layer.

12. A method of developing an electrostatic latent image as set forth in claim 1, wherein the resin-coating layer is formed by previously treating core particles with a catalyst and then polymerizing olefinic monomers on a surface of the core particles.

13. A method of developing an electrostatic latent image as set forth in claim 1, wherein the magnetic member has two poles of the same polarity arranged next to each other at the position opposite to the electrostatic latent image-retaining member.

14. A method of developing an electrostatic latent image as set forth in claim 1, wherein the developing step is performed under a developing bias voltage with a direct current component and an alternative current component overlapped.

15. A method of developing an electrostatic latent image as set forth in claim 13, wherein a development is carried out by bringing the magnetic brush formed on the upstream side in the developer-conveying direction from the magnetic pole portions having the same polarity into contact with the electrostatic latent image-retaining member at the developing zone.

16. A method of developing an electrostatic latent image as set forth in claim 13, wherein a development is carried out by bringing the magnetic brush formed on the downstream side in the developer-conveying direction from the magnetic pole portions having the same polarity into contact with the electrostatic latent image-retaining member in the developing zone.

17. A method of developing an electrostatic latent image as set forth in claim 13, wherein a development is carried out by bringing both magnetic brushes formed on the magnetic pole portions having the same polarity into contact with the electrostatic latent image-retaining member at the developing zone.

18. A method of developing an electrostatic latent image as set forth in claim 14, wherein a frequency of the alternating current component is 1000 to 3500 Hz.

19. A method of developing an electrostatic latent image as set forth in claim 14, wherein a peak-to-peak voltage of the alternating current component is within a range of 300 to 2500 V.

20. A method of developing an electrostatic latent image as set forth in claim 14, wherein the frequency (f) of the alternating current component and the peak-to-peak voltage (Vp-p) have a relation represented by the following formula; $Vp\text{-}p \leq f + 500$.

* * * * *